United States Patent
Gossain et al.

(10) Patent No.: US 10,425,753 B2
(45) Date of Patent: Sep. 24, 2019

(54) LOW-LATENCY AUDIO NETWORKING

(71) Applicant: SONOS, INC., Santa Barbara, CA (US)

(72) Inventors: Hrishikesh Gossain, Santa Barbara, CA (US); Jeffrey M. Peters, Cambridge, MA (US); Nicholas A. J. Millington, Santa Barbara, CA (US); Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/876,970

(22) Filed: Jan. 22, 2018

(65) Prior Publication Data

US 2018/0352353 A1 Dec. 6, 2018

Related U.S. Application Data

(63) Continuation of application No. 15/343,011, filed on Nov. 3, 2016, now Pat. No. 9,877,124, which is a
(Continued)

(51) Int. Cl.
*H04R 27/00* (2006.01)
*G06F 16/60* (2019.01)
(Continued)

(52) U.S. Cl.
CPC ............ *H04R 27/00* (2013.01); *G06F 16/60* (2019.01); *H04L 12/2838* (2013.01); *H04R 3/00* (2013.01);
(Continued)

(58) Field of Classification Search
CPC .......... H04B 1/69; H04B 7/12; H04B 10/271; H04B 10/272; H04N 21/4122;
(Continued)

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| EP | 2337391 A1 | 6/2011 |

(Continued)

OTHER PUBLICATIONS

AudioTron Quick Start Guide, Version 1.0, Mar. 2001, 24 pages.
(Continued)

*Primary Examiner* — Leshui Zhang

(57) ABSTRACT

Low-latency audio networking is disclosed. In one embodiment, an example playback device includes a processor and memory having stored thereon instructions executable by the processor. The example instructions are to cause the first playback device to perform functions comprising: receiving audio information; selecting a first frequency channel of a first spectrum based on a threshold latency associated with the audio information; transmitting to the second playback device via a second frequency channel of a second spectrum, control information that identifies the first frequency channel of the first spectrum; and transmitting to the second playback device via the first frequency channel of the first spectrum, the audio information to be played by the second playback device.

17 Claims, 15 Drawing Sheets

Related U.S. Application Data continuation of application No. 14/674,729, filed on Mar. 31, 2015, now Pat. No. 9,529,906, which is a continuation of application No. 13/524,808, filed on Jun. 15, 2012, now Pat. No. 9,031,255.

(51) Int. Cl.

| | | |
|---|---|---|
| *H04R 3/00* | (2006.01) | |
| *H04L 12/28* | (2006.01) | |
| *H04R 29/00* | (2006.01) | |
| *H04W 16/14* | (2009.01) | |
| *H04N 21/436* | (2011.01) | |
| *H04N 21/472* | (2011.01) | |
| *H04R 5/04* | (2006.01) | |
| *H04W 72/08* | (2009.01) | |
| *H04W 88/06* | (2009.01) | |

(52) U.S. Cl.
CPC .......... *H04R 29/007* (2013.01); *H04W 16/14* (2013.01); *H04L 2012/2849* (2013.01); *H04N 21/43615* (2013.01); *H04N 21/47217* (2013.01); *H04R 5/04* (2013.01); *H04R 2205/024* (2013.01); *H04R 2227/003* (2013.01); *H04R 2227/005* (2013.01); *H04R 2420/01* (2013.01); *H04R 2420/07* (2013.01); *H04W 72/082* (2013.01); *H04W 88/06* (2013.01)

(58) Field of Classification Search
CPC ....... H04N 21/41407; H04N 21/47217; H04N 21/4825; H04N 21/485; H04N 21/43637; H04N 21/4858; H04W 4/008; H04W 72/042; H04W 72/0426; H04W 72/0433; H04W 72/048; H04W 72/1215; H04W 72/1231; H04W 72/1236; H04W 72/1294; H04W 72/14; H04W 16/14; H04W 76/025; H04W 76/028; H04W 84/20; G08C 2201/20; H04L 69/14; H04L 5/06; H04L 5/08; H04L 65/1069; H04L 65/1073; H04L 69/18; H04R 2420/07; H04R 2227/003; H04R 2227/005; H04R 2225/39; H04R 2225/51; H04R 2225/55; H04R 2225/61; H04R 2205/021; H04S 3/008
USPC .... 381/1–4, 6, 7, 12, 14, 16, 17, 22, 23, 61, 381/314, 315, 77, 80, 81, 82, 85, 334, 97, 381/98, 123; 455/3.03, 3.06, 198.1, 104; 379/101.01, 269
See application file for complete search history.

(56) References Cited

U.S. PATENT DOCUMENTS

| | | | |
|---|---|---|---|
| 5,923,902 A | | 7/1999 | Inagaki |
| 6,032,202 A | | 2/2000 | Lea et al. |
| 6,256,514 B1 | | 7/2001 | Dent et al. |
| 6,256,554 B1 | | 7/2001 | DiLorenzo |
| 6,404,811 B1 | | 6/2002 | Cvetko et al. |
| 6,469,633 B1 | | 10/2002 | Wachter |
| 6,522,886 B1 | | 2/2003 | Youngs et al. |
| 6,611,537 B1 | | 8/2003 | Edens et al. |
| 6,631,410 B1 | | 10/2003 | Kowalski et al. |
| 6,757,517 B2 | | 6/2004 | Chang |
| 6,778,869 B2 | | 8/2004 | Champion |
| 6,801,529 B1 | | 10/2004 | McGrane et al. |
| 7,130,608 B2 | | 10/2006 | Hollstrom et al. |
| 7,130,616 B2 | | 10/2006 | Janik |
| 7,143,939 B2 | | 12/2006 | Henzerling |
| 7,236,773 B2 | | 6/2007 | Thomas |
| 7,277,692 B1 * | | 10/2007 | Jones .................... H04S 3/00 340/574 |
| 7,295,548 B2 | | 11/2007 | Blank et al. |
| 7,483,538 B2 | | 1/2009 | McCarty et al. |
| 7,571,014 B1 | | 8/2009 | Lambourne et al. |
| 7,630,501 B2 | | 12/2009 | Blank et al. |
| 7,643,894 B2 | | 1/2010 | Braithwaite et al. |
| 7,657,910 B1 | | 2/2010 | McAulay et al. |
| 7,853,341 B2 | | 12/2010 | McCarty et al. |
| 7,949,727 B2 | | 5/2011 | Jensen |
| 7,987,294 B2 | | 7/2011 | Bryce et al. |
| 8,000,820 B2 | | 8/2011 | Griffin et al. |
| 8,014,423 B2 | | 9/2011 | Thaler et al. |
| 8,045,952 B2 | | 10/2011 | Qureshey et al. |
| 8,050,203 B2 | | 11/2011 | Jacobsen et al. |
| 8,103,009 B2 | | 1/2012 | McCarty et al. |
| 8,234,395 B2 | | 7/2012 | Millington et al. |
| 8,290,603 B1 | | 10/2012 | Lambourne |
| 8,483,853 B1 | | 7/2013 | Lambourne |
| 8,538,564 B2 | | 9/2013 | Almstrand et al. |
| 8,572,224 B2 | | 10/2013 | Hite et al. |
| 9,031,255 B2 | | 5/2015 | Beckhardt et al. |
| 2001/0042107 A1 | | 11/2001 | Palm |
| 2002/0022453 A1 | | 2/2002 | Balog et al. |
| 2002/0026442 A1 | | 2/2002 | Lipscomb et al. |
| 2002/0124097 A1 | | 9/2002 | Isely et al. |
| 2003/0157951 A1 | | 8/2003 | Hasty |
| 2004/0024478 A1 | | 2/2004 | Hans et al. |
| 2005/0131558 A1 | | 6/2005 | Braithwaite et al. |
| 2006/0041916 A1 | | 2/2006 | McQuaide, Jr. |
| 2006/0145815 A1 | | 7/2006 | Lanzieri et al. |
| 2006/0153155 A1 | | 7/2006 | Jacobsen et al. |
| 2007/0129018 A1 | | 6/2007 | Trainin et al. |
| 2007/0142944 A1 | | 6/2007 | Goldberg et al. |
| 2007/0173293 A1 | | 7/2007 | Tran |
| 2007/0214229 A1 | | 9/2007 | Millington et al. |
| 2007/0281648 A1 | | 12/2007 | Rokusek et al. |
| 2008/0144500 A1 | | 6/2008 | Chen et al. |
| 2008/0152165 A1 | | 6/2008 | Zacchi |
| 2008/0175197 A1 | | 7/2008 | Shao et al. |
| 2008/0198836 A1 | | 8/2008 | Sun |
| 2008/0205430 A1 | | 8/2008 | Matsui |
| 2009/0046869 A1 | | 2/2009 | Griffin, Jr. et al. |
| 2009/0092154 A1 | | 4/2009 | Malik et al. |
| 2009/0196180 A1 | | 8/2009 | Bahl et al. |
| 2009/0238297 A1 | | 9/2009 | Zhang et al. |
| 2009/0240808 A1 | | 9/2009 | Chen |
| 2010/0075704 A1 | | 3/2010 | McHenry et al. |
| 2010/0105325 A1 * | | 4/2010 | Halla .................. H04M 1/7253 455/41.2 |
| 2010/0162329 A1 | | 6/2010 | Ford et al. |
| 2010/0214916 A1 | | 8/2010 | Wu et al. |
| 2011/0050478 A1 | | 3/2011 | Choi et al. |
| 2011/0069720 A1 | | 3/2011 | Jacobs et al. |
| 2011/0110349 A1 | | 5/2011 | Grandhi |
| 2011/0116413 A1 | | 5/2011 | Arai |
| 2011/0149768 A1 | | 6/2011 | Kang et al. |
| 2012/0040676 A1 | | 2/2012 | Jang et al. |
| 2012/0093152 A1 | | 4/2012 | Singh et al. |
| 2012/0147268 A1 * | | 6/2012 | Hassan .................... H04B 1/69 348/552 |
| 2012/0158839 A1 | | 6/2012 | Hassan et al. |
| 2013/0114421 A1 | | 5/2013 | Qian et al. |
| 2013/0286998 A1 | | 10/2013 | Tamai |
| 2014/0010326 A1 | | 1/2014 | Chari |

FOREIGN PATENT DOCUMENTS

| | | | |
|---|---|---|---|
| JP | 2011254458 | | 12/2011 |
| JP | 2014506044 | | 3/2014 |
| WO | 0011908 | | 3/2000 |
| WO | 200153994 | | 7/2001 |
| WO | 2003093950 A2 | | 11/2003 |
| WO | 2007067550 A2 | | 6/2007 |
| WO | 2011139670 | | 11/2011 |
| WO | WO-2011139670 A2 * | 11/2011 | ............. H04L 5/001 |

(56) References Cited

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action and translation dated Mar. 21, 2017, issued in connection with Chinese Patent Application No. 2013800399871, 14 pages.
Corrected Notice of Allowance dated Nov. 23, 2016, issued in connection with U.S. Appl. No. 14/674,729, filed Mar. 31, 2015, 2 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Communication pursuant to Rules 161(2) and 162 EPC, dated Jan. 29, 2015, issued in connection with European Application No. 13804705.5, 4 pages.
European Patent Office, Extended European Search Report dated Apr. 21, 2016, issued in connection with European Patent Application No. 13804705.5, 7 pages.
International Searching Authority, International Search Report and Written Opinion dated Feb. 19, 2014, issued in connection with International Application No. PCT/US2013/045643, filed on Jun. 13, 2013, 14 pages.
Japanese Patent Office, Office Action dated Mar. 22, 2016, issued in connection with Japanese Patent Application No. JP2015-517424, 13 pages.
Japanese Patent Office, Office Action dated Jan. 24, 2017, issued in connection with Japanese Patent Application No. 2015-517424, 4 pages.
Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jul. 1, 2016, issued in connection with U.S. Appl. No. 14/674,729, filed Mar. 31, 2015, 21 pages.
Non-Final Office Action dated Jul. 2, 2014, issued in connection with U.S. Appl. No. 13/524,808, filed Jun. 15, 2012, 38 pages.
Non-Final Office Action dated May 18, 2017, issued in connection with U.S. Appl. No. 15/343,011, filed Nov. 3, 2016, 13 pages.
Notice of Allowance dated Sep. 15, 2017, issued in connection with U.S. Appl. No. 15/343,011, filed Nov. 3, 2016, 8 pages.
Notice of Allowance dated Jan. 20, 2015, issued in connection with U.S. Appl. No. 13/524,808, filed Jun. 15, 2012, 35 pages.
Notice of Allowance dated Oct. 24, 2016, issued in connection with U.S. Appl. No. 14/674,729, filed Mar. 31, 2015, 8 pages.
Palm, Inc., "Handbook for the Palm VII Handheld," May 2000, 311 pages.
Presentations at WinHEC 2000, May 2000, 138 pages.
Supplemental Notice of Allowability dated Mar. 17, 2015, issued in connection with U.S. Appl. No. 13/524,808, filed Jun. 15, 2012, 4 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, European Extended Search Report dated Feb. 1, 2019, issued in connection with European Application No. 18170153.3, 8 pages.

\* cited by examiner

LOW-LATENCY AUDIO NETWORKING

CROSS REFERENCE TO RELATED APPLICATIONS

This application claims priority under 35 U.S.C. § 120 to, and is a continuation of U.S. patent application Ser. No. 15/343,011 filed on Nov. 3, 2016, entitled "Low-Latency Audio Networking", which claims the benefit of priority as a continuation to U.S. patent application Ser. No. 14/674,729 filed on Mar. 31, 2015, entitled "Low-Latency Audio Networking", which claims the benefit of priority as a continuation to U.S. patent application Ser. No. 13/524,808 entitled "Systems, Methods, Apparatus, and Articles of Manufacture to Provide Low-Latency Audio" filed on Jun. 15, 2012 and issued on May 12, 2015 as U.S. Pat. No. 9,031,255, the contents each of which are hereby incorporated by reference in their entireties for all purposes.

FIELD OF THE DISCLOSURE

The disclosure is related to consumer goods and, more particularly, to systems, products, features, services, and other items directed to low latency audio or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
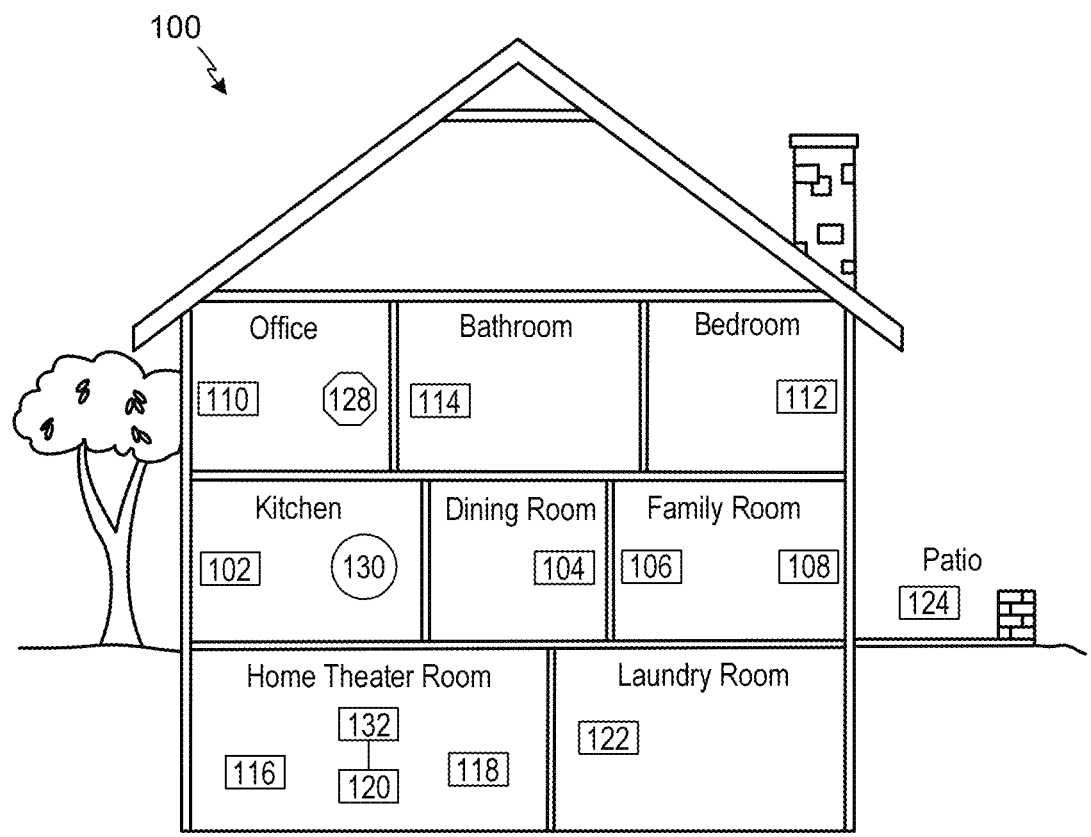
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio (e.g., music, talk radio, audio books, the audio accompanying video such as a television program or movie, etc.) out loud may be a social activity that involves family, friends, or both. For example, in a household, people may play music out loud at parties and other social gatherings, or they may want to watch a movie with full surround audio effects. In such environments, people may wish to play the audio in multiple listening zones simultaneously, such that the audio in each listening zone may be synchronized, without audible echoes or glitches. Such an experience may be further enriched by systems that can play multi-channel audio with enhanced audio processing. Listening to audio out loud may also be an individual experience. For example, an individual may play music out loud for himself or herself in the morning before work, or they may watch a movie in the evening after dinner. For these individual experiences, the individual may choose to either use headphones, or limit the out loud playback of audio content to a single zone or area.

In the present application, systems and methods are provided to offer a unique wired, wireless, or both wired and wireless audio solution that allows audio content to, among other things, be played in a single listening zone or across multiple listening zones simultaneously and in synchrony. The audio content may be played out loud or using headphones, for instance. In an example, such a system may include audio players, often referred to as zone players or players, and controllers, which may also be a player. One or more controllers may be used to control the system, and may include capabilities for browsing and selecting audio content for playback, viewing and editing audio content in one or more playback queues, or grouping and ungrouping zone players into one or more listening zones, etc. In a sense, the system may operate, in some embodiments, as a distributed system such that each controller has full control over the entire system, and each player has the ability to play audio content from either a same audio source or a different audio source as another player.

Example systems, methods, apparatus, and articles of manufacture disclosed herein provide for low-latency delivery and playback of audio. Example systems, methods, apparatus, and articles of manufacture disclosed herein may be advantageously used to provide wireless playback of audio in a home theater environment while reducing or avoiding perceptible lag between presented video and audio. Embodiments disclosed herein may be further useful in systems in which low-latency delivery of audio content over a wireless communication link is required or preferred.

As described in greater detail below, the systems, methods, apparatus, and articles of manufacture disclosed herein can provide a user of an audio playback device with a control method using different user input devices. In an example of operation, a home theater audio system is connected to a television. The example home theater audio system includes a sound bar positioned near the television and directed at a viewer, two satellite speakers positioned on the left and right sides of the viewer, and a subwoofer (which may be a type of satellite speaker). In this example, the sound bar establishes and controls a peer-to-peer network that wirelessly connects to each of the satellite speakers and the subwoofer. In home theater mode, the example home theater audio system plays back audio corresponding to video played on the television.

Continuing with the example, the sound bar receives audio from the television (or other audio or video source devices such as a CD, DVD, or Blu-ray™ player, or separately via an Internet audio or video streaming service), and transmits respective audio to the satellite speakers and the subwoofer. The example sound bar can communicate with other zone players in the system via a wireless channel in a first wireless spectrum, such as a 2.4 GHz channel, and communicates with the satellite speakers and the subwoofer via a wireless channel in a second wireless spectrum, such as a 5 GHz spectrum channel. Using the second spectrum, the example home theater audio system plays the home theater audio with low latency. For example, the home theater audio system may play the audio within 30 milliseconds (ms) of display on the television of a portion of video that corresponds to the audio. The low latency transmission improves the user perception of synchronization between the video and audio without sacrificing audio quality. The example home theater audio system also handles unintended dropouts of connections and unacceptable interference with selected channels by rapidly restoring playback of low-latency audio.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
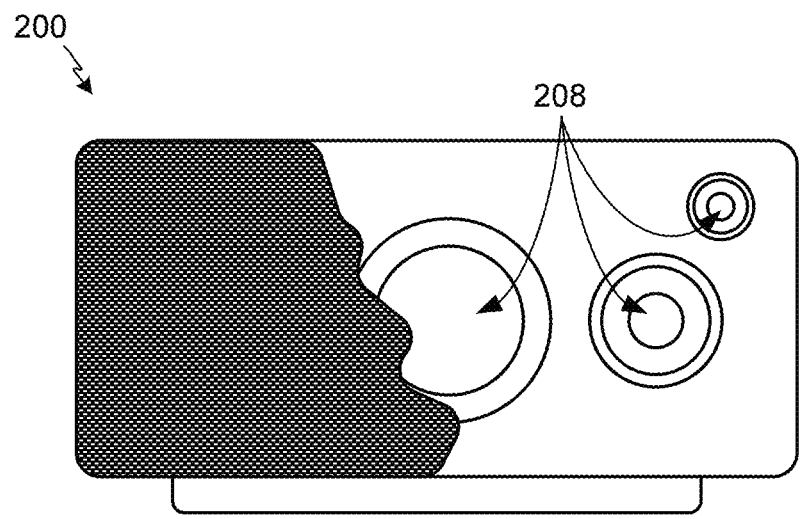
FIG. 2A shows an illustration of an example zone player having a built-in amplifier and speakers.
Figure 2B:
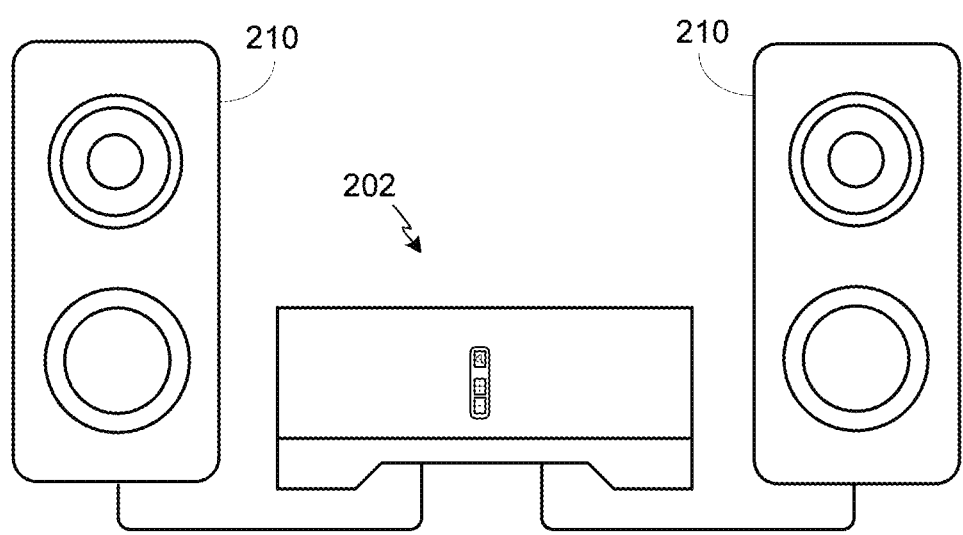
FIG. 2B shows an illustration of an example zone player having a built-in amplifier and connected to external speakers.
Figure 2C:
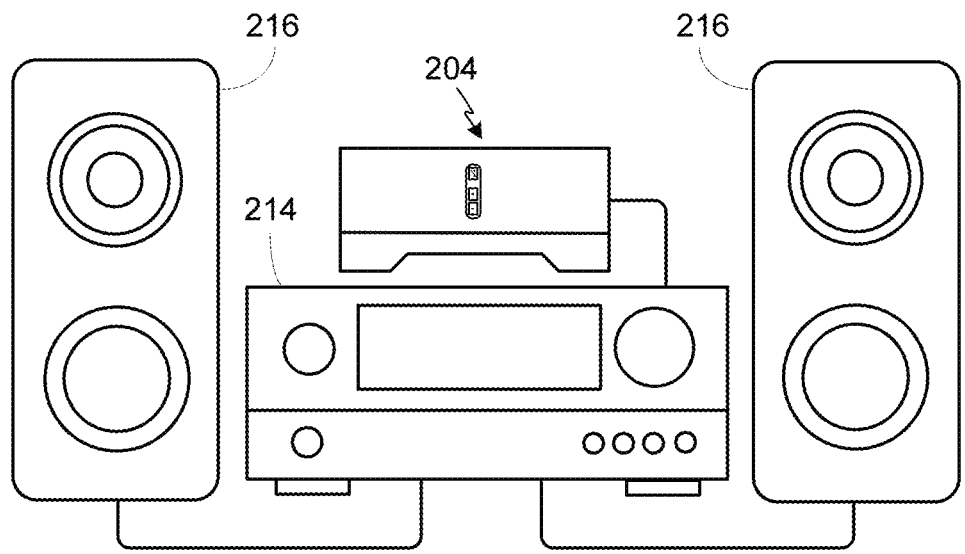
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer might include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played. Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player might consist of a wired or wireless headphone. In yet another example, a zone player might include a sound bar for television. In yet another example, a zone player can include or interact with a docking station for an Apple iPod™ or similar device.

b. Example Controllers

Figure 3:
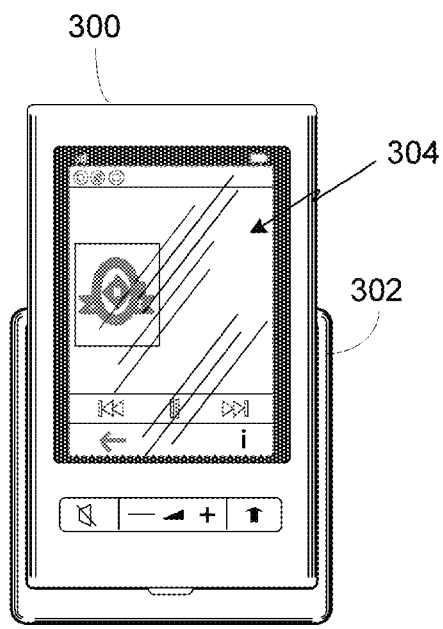
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination might happen, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone, or any other smart phone or network-enabled device can be used as controller 130. An application running on a laptop or desktop PC or Mac can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "Sonos CONTROL," "Sonos® Controller for iPhone," "Sonos® Controller for iPad," "Sonos® Controller for Android, "Sonos® Controller for Mac or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AirPlay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
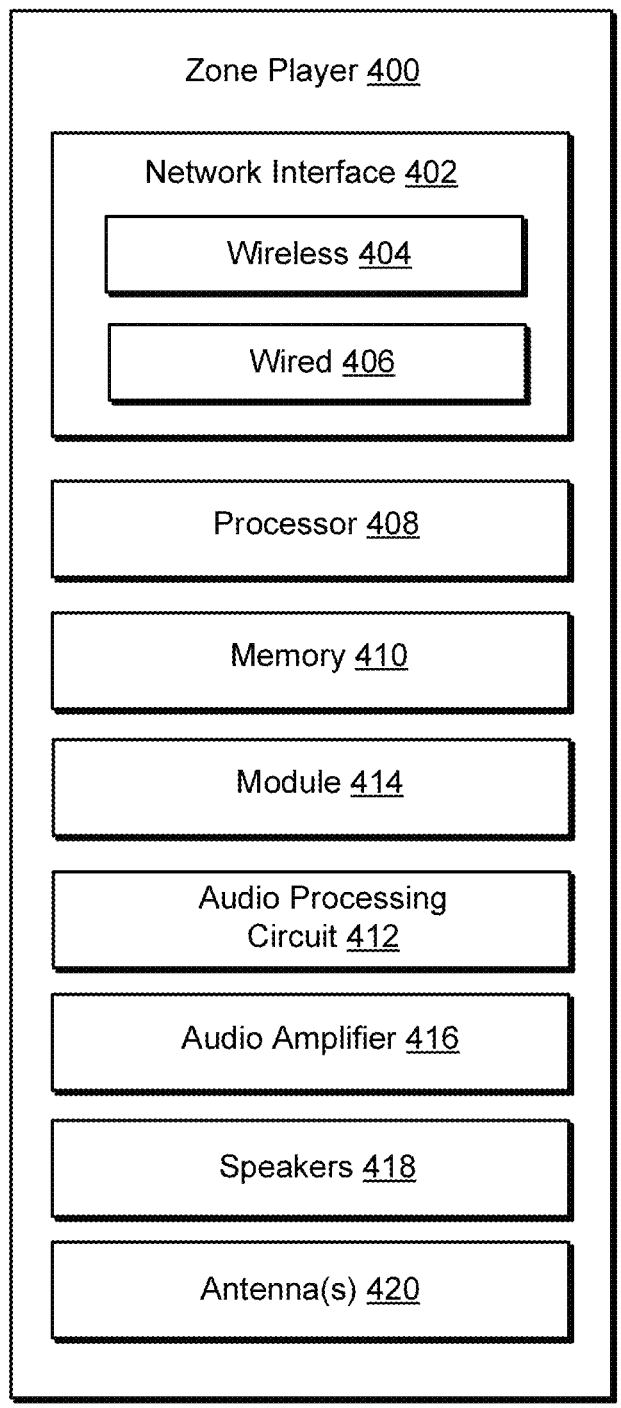
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a URL or some other identifier). In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from the PLAY:5.

IV. Controller

Figure 5:
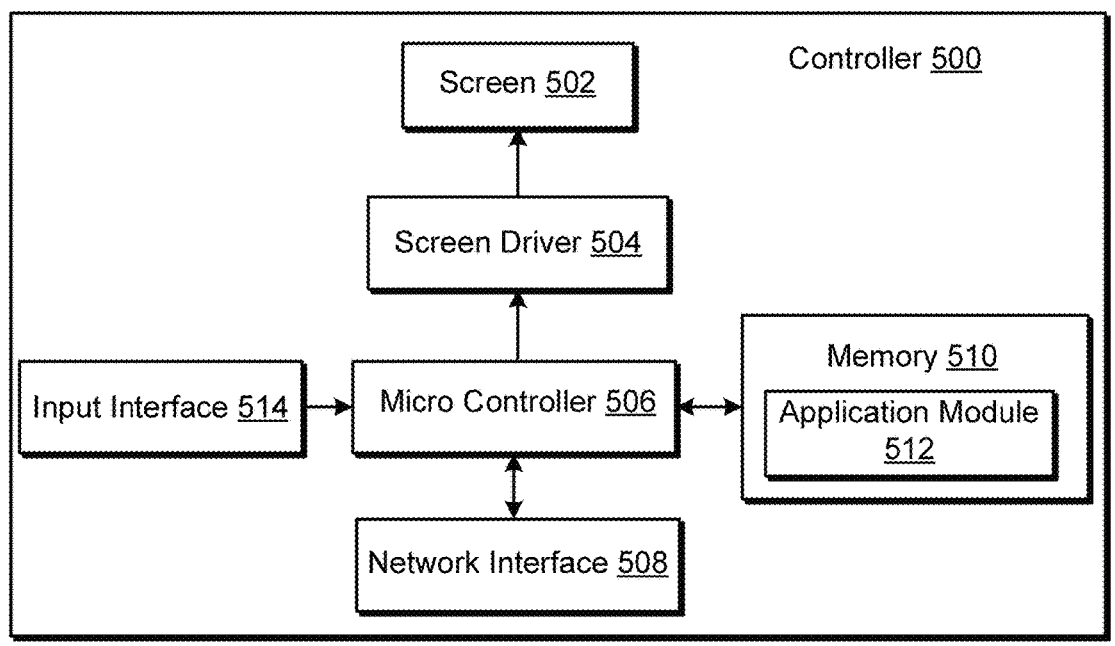
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone iPad® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Providing Low-Latency Audio

The following definitions will be used throughout this disclosure:

The terms "spectrum" or "wireless spectrum" refer to a range of wireless communications frequencies, where different "spectra" (multiple spectrum) refer to different ranges of wireless frequencies. Different spectra may or may not overlap. Different spectra may or may not be contiguous (i.e., may or may not have spectra between them). In some examples disclosed herein, the term spectrum refers to a regulatory spectrum as defined by a regulatory agency such as the Federal Communications Commission (FCC) in the United States. For example, the FCC has allocated the "2.4 GHz spectrum" (or spectral band) to include the frequency range of 2400 MHz to 2500 MHz for Industrial, Scientific, and Medical applications. Additionally, the FCC has allocated the "5 GHz spectrum" (or spectral band) to include the frequency range of about 5.17 GHz to about 5.835 GHz, with some excepted bands within that range.

The terms "channel," "audio channel," "control channel," and/or, more generally, "wireless channel," all refer to a distinct frequency or distinct sub-range(s) of frequencies within one or more spectra that may be used to transmit particular information. A channel may be a band of frequencies, a non-contiguous set of frequencies and bands, a frequency hopping configuration, time division multiplexing, code division multiplexing, and/or any other type of communication frequency arrangement.

The terms "primary" or "primary zone player" refer to a zone player configured to control a low-latency audio network having zero or more "satellite" zone players. A "satellite" or "satellite zone player" refers to a zone player configured to provide low-latency audio in combination with a primary zone player. Both primary zone players and satellite zone players may be configurable to operate in other audio playback arrangements, such as in a zone group.

The term "low-latency audio" refers to audio played within a threshold time of another event (e.g., video played on a monitor substantially synchronized with audio played via a zone player). For instance, in some embodiments audio is considered low-latency when the audio is played within a threshold time (e.g., 30 milliseconds) of the corresponding video being shown. In some embodiments audio is considered low-latency when the audio is played (e.g., from a speaker) within a threshold time (e.g., 30 milliseconds) of being provided from a source of the audio (e.g., from a media source such as a television, a cable set top box, a digital media player, a DVD player, a Blu-ray disc player, etc.). Other measures of latency and low-latency may be used in different embodiments and even have different meanings depending on the application.

Figure 6:
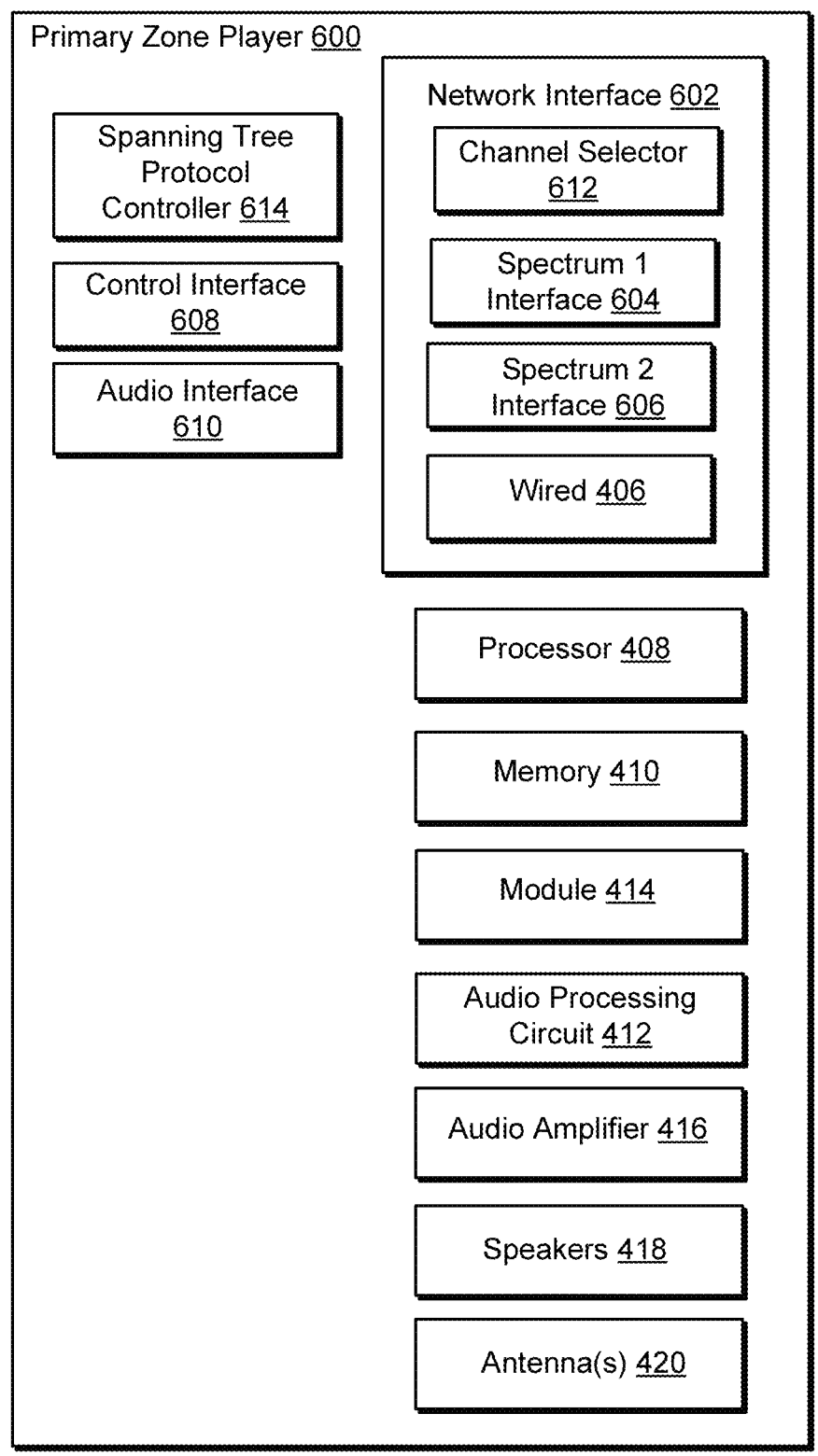
FIG. 6 shows an internal functional block diagram of an example primary zone player to provide low-latency audio.

FIG. 6 shows an internal functional block diagram of an example primary zone player 600 to provide low-latency audio. The example primary zone player 600 of FIG. 6 may be used to implement any of the example zone players 102-124 of FIG. 1. In some embodiments, the example primary zone player 600 may be used to implement one of the home theater zone players 116, 118, 120 and may include a sound bar. As used herein, a "sound bar" refers to a single playback device including an array of speakers configured to replicate audio for video and to replicate audio in general. In some instances, a sound bar may simulate or partially simulate a surround sound experience.

Like the example zone player 400 of FIG. 4, the example primary zone player 600 of FIG. 6 includes a processor 408, memory 410, an audio processing component 412, a module 414, an audio amplifier 416, speakers 418, and one or more antenna(s) 420. These components are discussed in more detail above. More or less components may be included depending on the desired configuration. The example primary zone player 600 of FIG. 6 includes a network interface 602 having a first interface 604 (Spectrum 1 interface) to communicate via a first wireless spectrum (e.g., the 2.4 GHz spectrum), a second interface 606 (Spectrum 2 interface) to communicate via a second wireless spectrum different from the first wireless spectrum (e.g., the 5 GHz spectrum), and a wired interface 406. The wired interface 406 is discussed above. The example primary zone player 600 may simultaneously or substantially simultaneously communicate via any or all of the interfaces 406, 604, 606.

Each of the example interfaces 406, 604, 606 of FIG. 6 may have a unique identifier such as a unique Media Access Control (MAC) address. Thus, each of the example interfaces 406, 604, 606 may be addressed separately, and the example primary zone player 600 may communicate using any or all of the interfaces 406, 604, 606 simultaneously if so desired.

The example primary zone player 600 of FIG. 6 further includes a control interface 608 and an audio interface 610. The control interface 608 transmits and/or receives control information (e.g., configuration information) via the first and second spectrum interfaces 604, 606. For example, the control interface 608 may communicate configuration information to one or more satellite zone players and/or communicate configuration information to one or more other zone players via the first spectrum interface 604. In some examples, the control interface 608 receives configuration information via the first spectrum interface 604 from other zone players. The example control interface 608 additionally or alternatively communicates control information (e.g., channel probes, keep-alive probes, etc.) to satellite zone players via the second spectrum interface 606.

The example audio interface 610 of FIG. 6 transmits audio information and/or receives audio information via the interfaces 406, 416, 604, 606. For example, the audio interface 610 may receive digital audio information from an Internet source, from a local networked source (e.g., a computer via a LAN), and/or from another home theater component such as a television, a cable box, an optical media player (DVD, Blu-ray disc, etc.), a digital media player, a video game console, and/or any other type of audio source. The example audio interface 610 further transmits received audio information to one or more zone players, including standard zone players (e.g., via line-out connection such as RCA or optical output, or via a mesh network via the first spectrum interface 604, such as a 2.4 GHz interface) and/or satellite zone players (e.g., via a star network via the first spectrum interface 604 and/or the second spectrum interface 606). In some examples, the audio interface 610 transmits the audio information based on control information provided by the control interface 608. Examples of operation of the example first and second spectrum interfaces 604, 606, the control interface 608, and the audio interface 610 are described in more detail below.

To control which channels are used in the first and second spectra, the example network interface 602 further includes a channel selector 612. The example channel selector 612 selects channels in the first spectrum. The example first spectrum interface 604 transmits and/or receives information via the selected channel. In some examples, the channel is selected by a different device (e.g., an external device such as another zone player), and the channel selector 612 is provided with the channel information via the first spectrum interface 604. The example channel selector 612 also selects channels for use in the second spectrum. The second spectrum interface 606 transmits and receives data via the selected channel(s) in the second spectrum.

In some examples, the currently selected channel may become unsuitable for low-latency audio, and another, more suitable channel is available. The example channel selector 612 may select a new channel within the same spectrum (e.g., the 5 GHz spectrum) and provide the channel information to the control interface 608. The example control interface 608 generates and sends a probe or other configuration information, including a command to switch channels and the new channel information, to any connected satellite zone players. The example channel selector 612 then causes the second spectrum interface 606 to change to the new selected channel. The audio interface 610 may then continue to transmit audio information on the new selected channel.

In some examples, the currently selected channel may become unsuitable for low-latency audio, and no other suitable channels are available within the same spectrum (e.g., the 5 GHz spectrum). The example channel selector 612 may select a channel within a different spectrum (e.g., the 2.4 GHz spectrum) and provide the channel information to the control interface 608. The example control interface 608 generates and sends a probe or other configuration information, including a command to switch channels and the new channel and spectrum information, to any connected satellite zone players. The audio interface 610 may then continue to transmit audio information on the new channel of the different spectrum.

The example primary zone player 600 of FIG. 6 further includes a spanning tree protocol controller 614 to control a spanning tree protocol configuration. Spanning tree protocol refers to a network protocol that structures a network to avoid bridge loops by, in general, 1) designating a root node, 2) calculating the least cost path from other nodes to the root node, and 3) disabling other paths. The example primary zone player 600 of FIG. 6 advantageously uses spanning tree protocol to communicate with satellite zone players and/or other zone players in a mesh network. The use of spanning tree protocol enables the delivery of low-latency audio by determining shortest paths between points and by reducing (e.g., avoiding) unnecessary hops of the low-latency audio data between zone players. An example spanning tree protocol configuration may be a spanning tree protocol table (e.g., stored in the memory 410) that includes the ports and/or devices to which the example primary zone player 600 is connected. The example spanning tree protocol controller 614 reconfigures the spanning tree protocol table when additional zone players are added and/or when configurations of zone players change. For example, the spanning tree protocol controller 614 changes the spanning tree protocol table when the primary zone player 600 disconnects from a satellite zone player (e.g., connected via a mesh networking mode) and reconnects to the same satellite zone player in a different networking mode (e.g., a star networking mode).

In an example of operation, the control interface 608 initially (e.g., on start up, on adding a satellite zone player to a zone player network) communicates with one or more satellite zone players via the first spectrum interface 604. The control interface 608 transmits control information to the satellite zone player(s) via a selected channel in the first spectrum. The example control information includes at least a selected channel in the second spectrum and an identifier of the primary zone player 600 (e.g., to differentiate the primary zone player 600 from any other primary zone players that may be on the same network). After transmitting the control information (and, in some embodiments, receiving acknowledgement from the satellite zone player(s)), the example audio interface 610 may begin transmitting audio information to the satellite zone player(s). In some embodiments, the audio interface 610 transmits zone player-specific audio information to each of multiple zone players (e.g., left surround channel audio to a zone player configured as a left surround speaker, right surround channel audio to a zone player configured as a right surround speaker).

Continuing with the example, if the selected channel in the second spectrum is inadequate (e.g., too much interference, too much latency, etc.), the example control interface 608 of FIG. 6 transmits control information to the satellite zone players to cause the satellite zone players to revert to communicating with the primary zone player 600 via a channel in the first spectrum and the first spectrum interface 604. The example channel selector 612 selects a different channel in the second spectrum and transmits control information to the satellite zone players identifying the newly selected channel.

Figure 7:
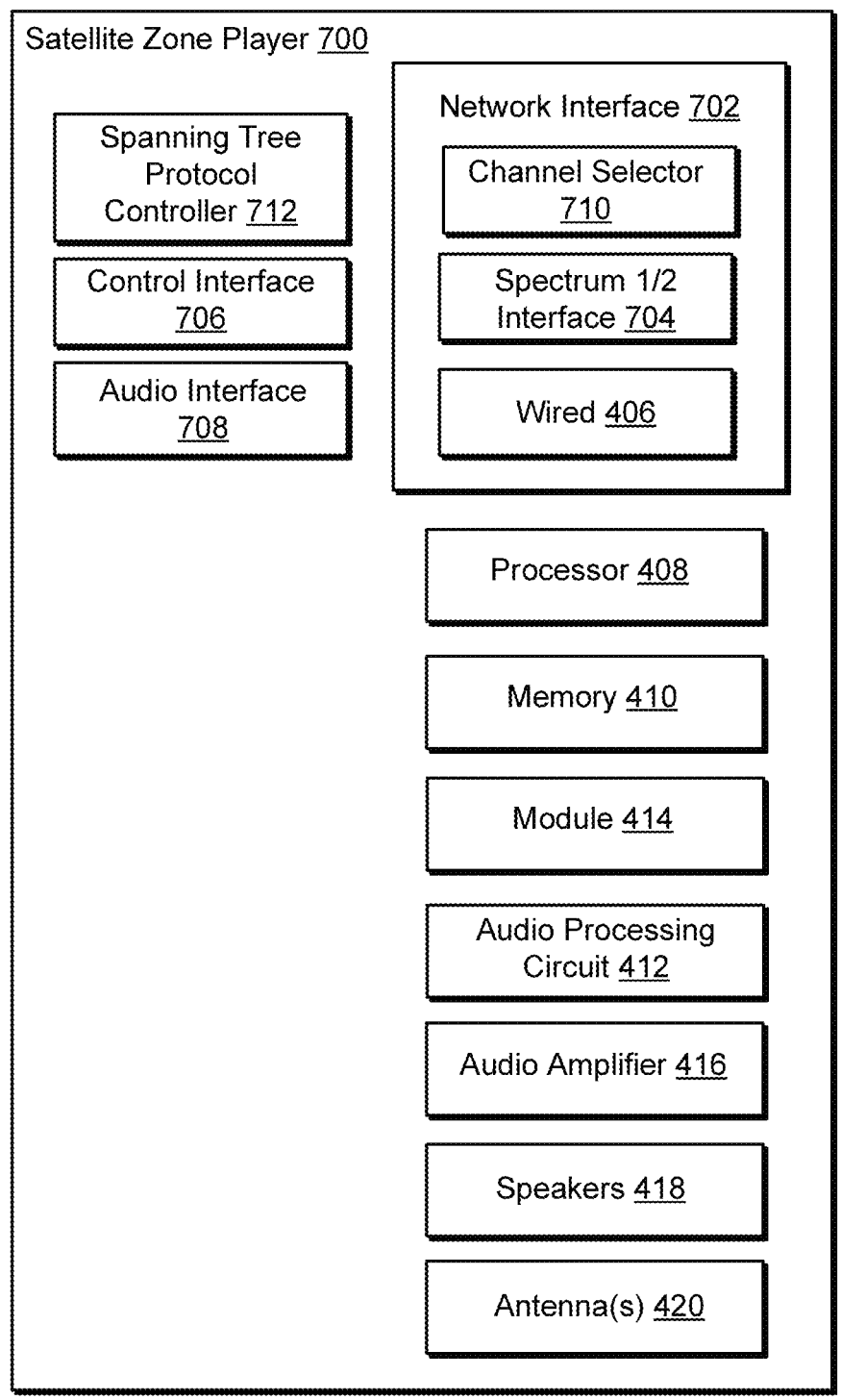
FIG. 7 shows an internal functional block diagram of an example satellite zone player to provide low-latency audio in combination with the example primary zone player of FIG. 6.

FIG. 7 shows an internal functional block diagram of an example satellite zone player 700 to provide low-latency audio in combination with the example primary zone player 600 of FIG. 6. The example satellite zone player 700 of FIG. 7 may be used to implement any of the example zone players 102-124 of FIG. 1. In some embodiments, the example primary zone player 600 may be used to implement any of the home theater zone players 116, 118, 120 and/or may be satellite speakers (e.g., left/right surround speakers, subwoofers, etc.) to complement a sound bar-type surround sound configuration.

Like the example zone player 400 of FIG. 4 and the example primary zone player 600 of FIG. 6, the example satellite zone player 700 of FIG. 7 includes a processor 408, memory 410, an audio processing component 412, a module 414, an audio amplifier 416, speakers 418, and one or more antenna(s) 420. These components are discussed in detail above. More or less components may be included depending on the desired configuration. The example satellite zone player 700 of FIG. 7 includes a network interface 702 having a dual spectrum interface 704 (Spectrum 1/2 interface) to communicate via a first wireless spectrum (e.g., the 2.4 GHz spectrum) and a second wireless spectrum different from the first wireless spectrum (e.g., the 5 GHz spectrum), and a wired interface 406. The wired interface 406 is discussed above.

In the examples of FIGS. 6 and 7, the dual spectrum interface 704 communicates in the same two spectra as the first and second wireless interfaces 604, 606. The example dual spectrum interface 704 may communicate in either the first spectrum (e.g., on a wireless channel in the first spectrum) or the second spectrum (e.g., on a wireless channel in the second spectrum) at a given time. In some other examples, the dual spectrum wireless interfaces 604, 606 may communicate in both spectra simultaneously or substantially simultaneously. In some examples, the dual spectrum interface 704 is replaced with separate first and second wireless interfaces, which may be similar or identical to the first and second wireless interfaces 604, 606 of FIG. 6. In some embodiments, each wireless interface is assigned a unique address (e.g., a MAC address).

The example satellite zone player 700 of FIG. 7 further includes a control interface 706 and an audio interface 708. The control interface 706 and the audio interface 708 transmit and/or receive information (e.g., control information, audio information) via the dual spectrum interface 704 and/or the wired interface 406. The example control interface 706 receives control information via a channel (e.g., from the primary zone player 600 of FIG. 6) in a first spectrum (e.g., Spectrum 1). The control information via the first spectrum indicates an audio channel in a second spectrum (e.g., Spectrum 2) via which audio information in addition to control information is to be transmitted to the satellite zone player 700 from the primary zone player 600.

The example control interface 706 also transmits control information, such as probe acknowledgements, configuration information, device information, and/or other information used for control and/or configuration of the satellite zone player 700 to a primary zone player 600 and/or to standard zone players.

The example audio interface 708 of FIG. 7 receives audio information to be played (e.g., via the speakers 418). The audio information may be received via an audio channel via which the dual spectrum interface 704 is communicating. In some examples, the audio interface 708 determines that the received audio information has a high quality of service characteristic and/or a low latency, indicating that the audio is to be played as soon as possible and/or at a designated time.

The example network interface 702 of FIG. 7 further includes a channel selector 710. The example channel selector 710 selects a wireless communications channel in the first spectrum or the second spectrum and causes the dual spectrum interface 704 to begin communicating on the selected channel.

In some examples, the control interface 706 may receive a notification from a primary zone player that communication is to be changed to a different channel in the second spectrum (e.g., the 5 GHz spectrum). This may occur if, for example, the channel being used has become unsuitable for low-latency audio and another, more suitable channel is available. The example control interface 706 provides the new channel to the channel selector 710, which causes the dual spectrum interface 704 to change channels within the same spectrum. In some examples, the control interface 706 may receive a notification from a primary zone player that communication is to be changed to a channel in the first spectrum (e.g., the 2.4 GHz spectrum). This may occur if, for example, the channel being used has become unsuitable for low-latency audio and no other more suitable channel is available in the second spectrum (e.g., 5 GHz spectrum). The example control interface 706 provides the channel to the channel selector 710, which causes the dual spectrum interface 704 to change channels and spectrum.

The example satellite zone player 700 further includes a spanning tree protocol controller 712 to control a spanning tree protocol configuration based on receiving control information (e.g., from a primary zone player). For example, a spanning tree protocol configuration may be a spanning tree protocol table (e.g., stored in the memory 410) that includes the ports and/or devices to which the example satellite zone player 700 is connected. The example spanning tree protocol controller 712 reconfigures the spanning tree protocol table when additional zone players are added and/or when configurations of the satellite zone player 700 changes. For example, the spanning tree protocol controller 712 changes the spanning tree protocol table when the satellite zone player 700 is reconfigured to connect to a primary zone player in a different networking mode (e.g., reconfigured from a mesh networking mode to a star networking mode).

FIGS. 8-11 show a block diagram of an example zone player network 800 during operation of the network 800. In particular, the example FIGS. 8-11 show connections between example zone players in the network in response to different configuration events.

Figure 8:
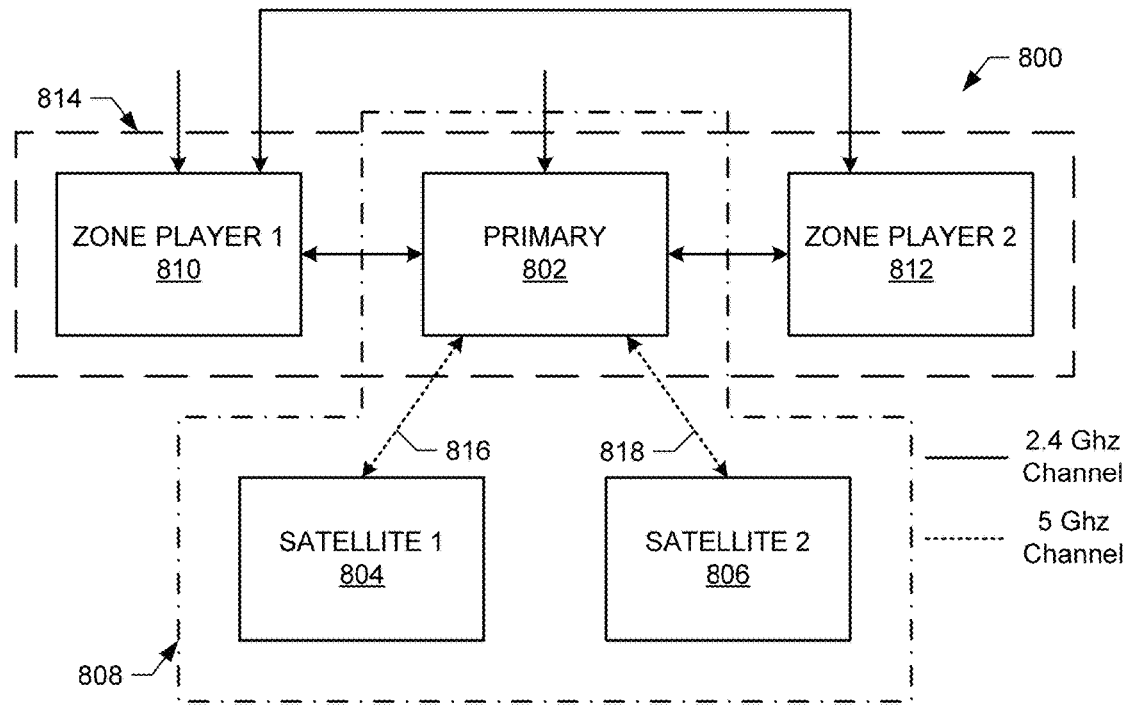
FIG. 8 shows a block diagram of an example zone player network in which a primary zone player is connected to satellite zone players in a star network and to additional zone players via a mesh network.

FIG. 8 shows a block diagram of an example zone player network 800 in which a primary zone player 802 is connected to satellite zone players 804, 806 via a star network 808 and to additional zone players 810, 812 via a mesh network 814. The example primary zone player 802 and the example satellite zone players 804, 806 may be configured in a home theater arrangement in a single location (e.g., in the same room). The example zone players 810, 812 may be located in the same or different rooms from the example primary and/or satellite zone players 802-806.

The example primary zone player 802 and the zone players 810, 812 are communicatively coupled via a first spectrum (e.g., a 2.4 GHz spectrum channel). The example zone players 802, 810, 812 in the mesh network 814 may communicate and/or synchronize audio information and/or control information as described in U.S. Pat. No. 8,020,023, the entirety of which is hereby incorporated by reference. At the direction of a user, additional zone players may be added to and/or removed from the mesh network 814; any of the zone players 802, 810, 812 may be removed from and/or rejoined to the mesh network 814; and/or any combination of the primary zone player 802, the zone player 810, and/or the zone player 812 may be grouped into zone groups for synchronized playback of audio. In the example of FIG. 8, a user may choose to cause audio provided to the primary zone player 802 that is part of a zone group with one or more of the zone player(s) 810, 812 to also be played via the satellite zone players 804, 806 in the star network 808.

In the example of FIG. 8, in which the primary zone player 802 is coupled via respective star wireless connections 816, 818 to the satellite zone players 804, 806. The establishment of the example connections 816, 818 is described in more detail below. The example primary zone player 802 and the satellite zone players 804, 806 are communicatively coupled via a second spectrum (e.g., a 5 GHz spectrum channel). The satellite zone players 804, 806 may be, for example, left and right rear surround speakers such as the Sonos PLAY:3 zone player. In some examples, one or more of the satellite zone players 804, 806 is a subwoofer zone player such as the Sonos SUB zone player.

The primary zone player 802 receives audio information from an audio source (e.g., a television, a networked source, an Internet source, via the zone player(s) 810, 812, etc.) to be played via the star network 808. The example primary zone player 802 determines the audio information to be transmitted to respective ones of the example satellite zone players 804, 806. For example, the Dolby Digital family of surround sound technology provides for audio channels corresponding to surround (e.g., rear) speakers. The primary zone player 802 transmits, via the second spectrum (e.g., 5 GHz spectrum) audio channel, the respective audio information to the satellite zone players 804, 806, which decode and play the audio information.

In the example of FIG. 8, the primary zone player 802 assigns different quality of service indicators to different types of information. For example, the primary zone player 802 may assign the highest quality of service (e.g., quality of service level 3) to audio information requiring a low latency (e.g., less than a threshold latency) that is transmitted to the satellite zone players 804, 806. The primary zone player 802 may assign a next highest quality of service (e.g., quality of service level 2) to audio information from one or more predetermined types of sources (e.g., a wired source, a home theater source, etc.) that is not transmitted to a satellite zone player (e.g., is transmitted to the zone players 810, 812). The example primary zone player 802 assigns a next highest quality of service (e.g., quality of service level 1) to audio information from other types of sources (or any source, if quality of service level 2 is not used) that is not transmitted to a satellite zone player (e.g., is transmitted to the zone players 810, 812). The example primary zone player 802 uses the lowest quality of service (e.g., quality of service level 0) to transmit background data (e.g., non-audio information, control information, configuration information, etc.) to other zone players (e.g., zone players 804, 806, 810, 812). The use of quality of service enables the star network 808 to provide low-latency audio, which improves user perception of a home theater presentation and reduces lag between video and audio to acceptable levels.

Figure 9:
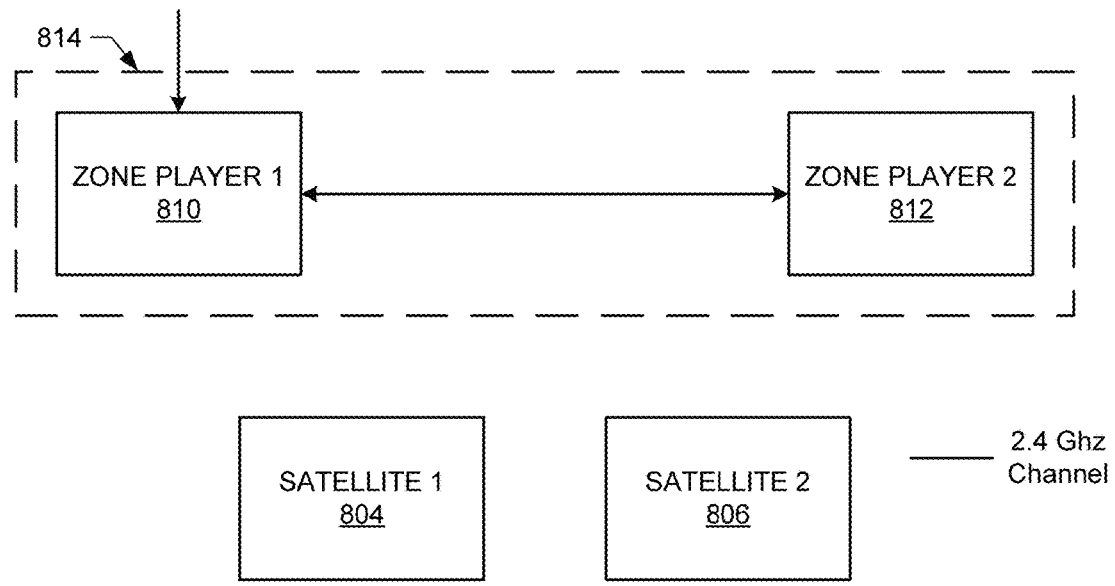
FIG. 9 shows the example zone player network of FIG. 8 in the case where the primary zone player has been removed from the zone player network.

FIG. 9 shows the example zone player network 800 of FIG. 8 when the primary zone player 802 is removed from the zone player network 800. The state of the example zone player network 800 illustrated in FIG. 9 is prior to the lapsing of a threshold time (e.g., a time-out interval). Removal of the primary zone player 802 may occur due to, for example, interference to the wireless communications (e.g., the spectrum interfaces 604, 606 of FIG. 6) and/or loss of power to the primary zone player 802.

Upon the removal of the primary zone player 802, the connections 816, 818 between the primary zone player 802 and the satellite zone players 804, 806 are also removed. The example satellite zone players 804, 806 recognize the loss of the connections 816, 818 and begin attempting to establish a connection with the primary zone player 802 via a 2.4 GHz channel (e.g., via the channel selector 710 and the dual spectrum interface 704 of FIG. 7). The example zone players 810, 812 maintain the mesh network 814 and may continue communicating as in FIG. 8.

Figure 10:
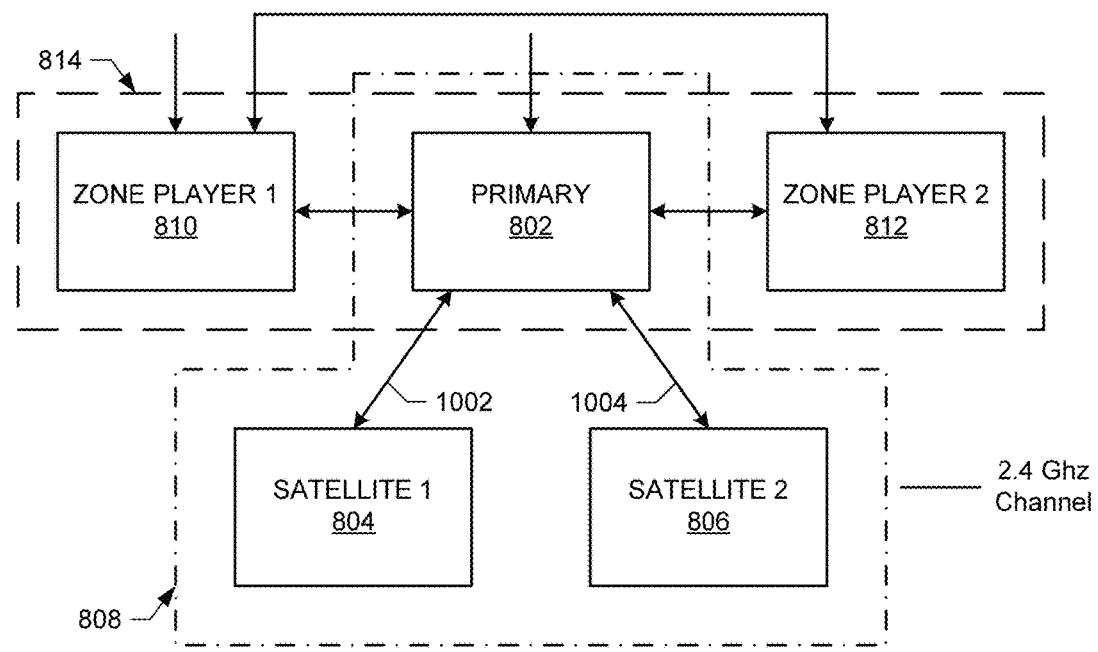
FIG. 10 shows the example zone player network of FIG. 8 in the case where the primary zone player has been removed and has rejoined the zone player network.

FIG. 10 shows the example zone player network 800 of FIG. 8 when the primary zone player 802 has been removed and has rejoined the zone player network 800. When the example primary zone player 802 rejoins the network 800 (e.g., due to the primary zone player 802 regaining power, interference being removed, etc.), the example primary zone player 802 reestablishes connections with the example zone players 810, 812 in the mesh network 814 via connections in the first spectrum (e.g., the 2.4 GHz spectrum).

The example primary zone player 802 also establishes respective mesh network connections 1002, 1004 with the satellite zone players 804, 806. In contrast to the star network connections 816, 818 of FIG. 8, the mesh network connections 1002, 1004 are established in the first spectrum (e.g., the 2.4 GHz spectrum used in the mesh network 814). Upon establishing the mesh network connections 1002, 1004, the example primary zone player 802 selects a channel in the second spectrum and transmits control information to the satellite zone players 804, 806 to cause the satellite zone players 804, 806 to begin communicating via the selected channel. As a result, the mesh network connections 1002, 1004 are removed, new connections via the selected channel in the second spectrum are created, and the state of the zone player network 800 becomes similar or identical to the state illustrated in FIG. 8.

Figure 11:
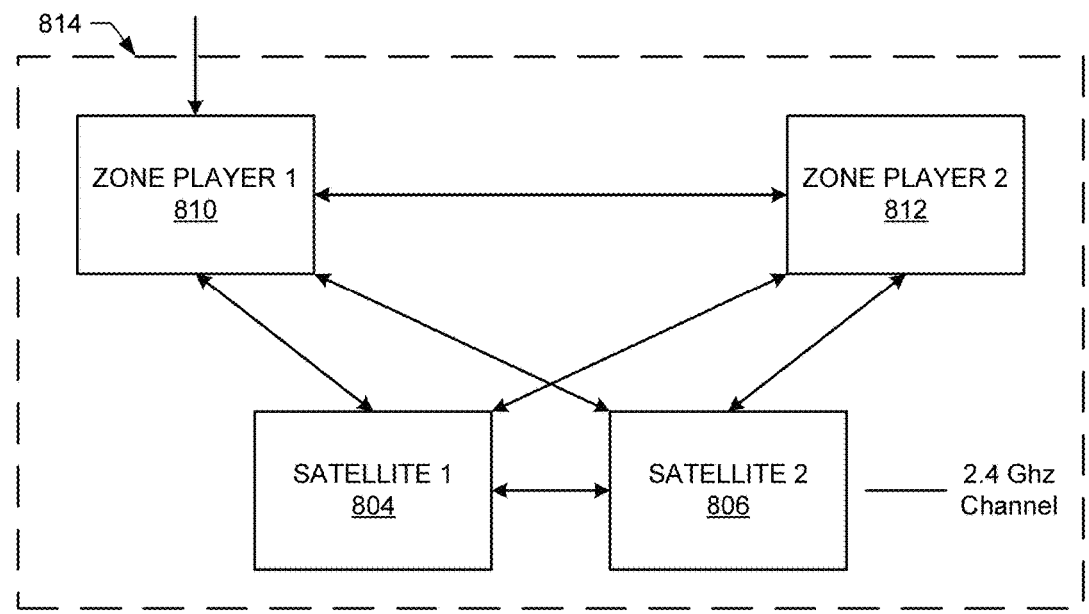
FIG. 11 shows the example zone player network of FIG. 8 in the case where the primary zone player has been removed from the zone player network for a threshold length of time.

FIG. 11 shows the example zone player network 800 of FIG. 8 when the primary zone player 802 has been removed from the zone player network 800 for a threshold length of time. For example, the zone player network 800 may change to the state illustrated in FIG. 11 if, after a threshold time, the zone player network 800 does not attain the state described above with reference to FIG. 10 (e.g., the primary zone player 802 does not return to the network 800).

In the example of FIG. 11, the satellite zone players 804, 806 switch from communicating in the second wireless spectrum to communicating in the first wireless spectrum. For example, the channel selector 710 of FIG. 7 selects or receives a channel on which the mesh network 814 is communicating. The example dual spectrum interface 704 changes to the selected channel. Because the primary zone player 802 is no longer in the network 800, the control interface 706 transmits configuration information to other zone players to join the mesh network 814. For example, the control interface 706 of the first satellite zone player 804 transmits configuration information via a channel in the first spectrum to the satellite zone player 806 and the zone players 810, 812.

The zone players 806, 810, 812 receiving the configuration information identify the satellite zone player 804 as a zone player within the mesh network 814. As a result, the satellite zone player 804 may be included in zone groups and/or otherwise configured as a standard zone player instead of as a star networked satellite zone player. When the configuration of the zone players 804, 806, 810, 812 has been completed, each of the zone players 804, 806, 810, and 812 are connected via the mesh network 814.

Figure 12:
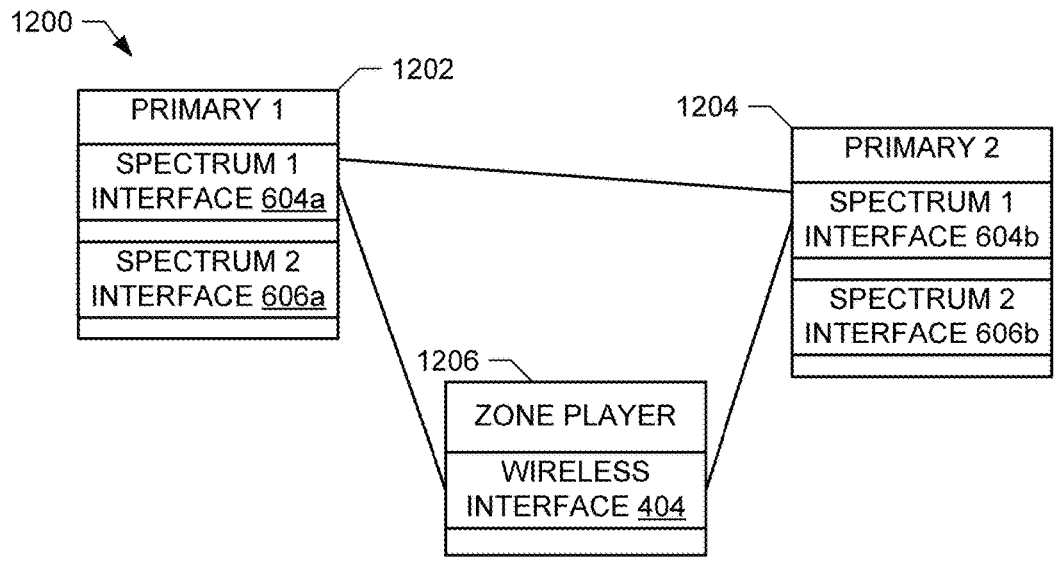
FIG. 12 shows a block diagram of another example zone player network including multiple primary zone players.

FIG. 12 shows a block diagram of another example zone player network 1200 including multiple primary zone players 1202, 1204. The example primary zone players 1202, 1204 may each be implemented by the example primary zone player 600 of FIG. 6. The example zone player network 1200 of FIG. 12 also includes a standard zone player 1206, which may be implemented by the example zone player 400 of FIG. 4. The example zone players 1202-1206 are configured in a mesh topology. The example primary zone players 1202, 1204 include respective first spectrum interfaces 604a, 604b (e.g., the first spectrum interface 604 of FIG. 6) and second spectrum interfaces 606a, 606b (e.g., the second spectrum interface 606 of FIG. 6). The example zone player 1206 includes a wireless interface 404. The example wireless interface 404 is configured to communicate via channels in the first spectrum (e.g., the 2.4 GHz spectrum).

Figure 13:
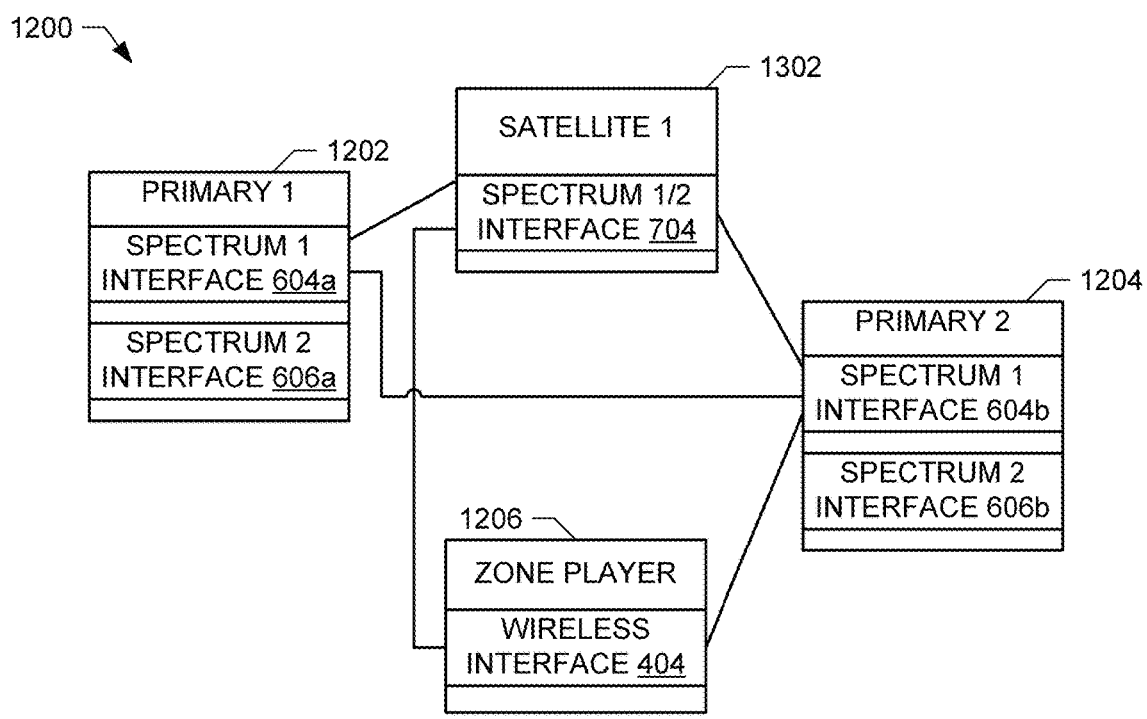
FIG. 13 shows the example zone player network of FIG. 12 when a satellite zone player has been added to the zone player network.

FIG. 13 shows the example zone player network 1200 of FIG. 12 when a satellite zone player 1302 has been added to the zone player network 1200. The example satellite zone player 1302 includes a dual spectrum interface 704 that may be configured to communicate via the first spectrum and/or the second spectrum.

When the example satellite zone player 1302 is added to the network 1200, the satellite zone player 1302 communicates via a wireless channel in the first spectrum. In some examples, the satellite zone player 1302 is initially configured to communicate via the mesh network connecting the zone players 1202-1206. The example satellite zone player 1302 of FIG. 13 uses a first MAC address to communicate with the zone players 1202-1206 in a mesh network.

Figure 14:
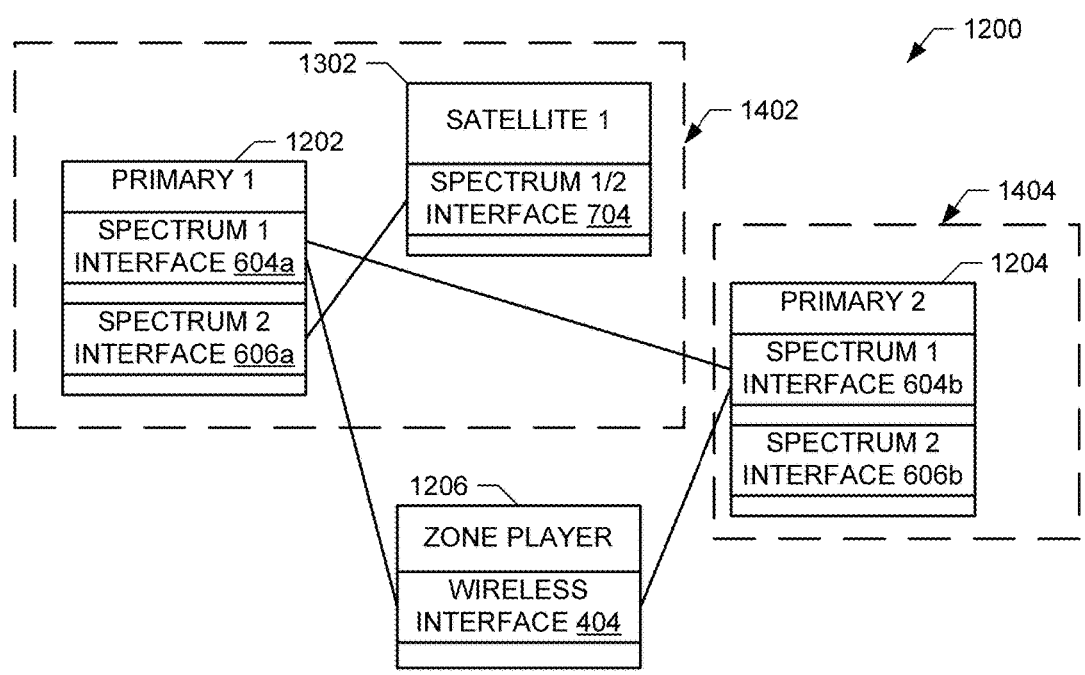
FIG. 14 shows the example zone player network of FIG. 12 when the satellite zone player of FIG. 13 has been configured to connect to one of the primary zone players via a star network.

FIG. 14 shows the example zone player network 1200 of FIG. 12 when the satellite zone player 1302 of FIG. 13 has been configured to connect the first example primary zone player 1202 via a star network 1402. At some time after the satellite zone player 1302 is connected to the network 1200, a user of the network 1200 selects to configure a star network (e.g., via a controller such as the controller 500 of FIG. 5) including the primary zone player 1202 and the satellite zone player 1302.

In response to the selection, the example primary zone player 1202 transmits control information, including a selected channel in the second spectrum and an identifier of the primary zone player 1202, to the satellite zone player 1302 via the first spectrum interface 604a. For example, the primary zone player 1202 may identify a unique device name (UDN) and/or a universally unique identifier (UUID) for the primary zone player 1202, such as the media access control (MAC) address of the second spectrum interface 606a. The UUID enables the satellite zone player 1302 to identify to which of the multiple primary zone players 1202, 1204 (e.g., which of multiple star networks) the satellite zone player 1302 is to connect.

After receiving the configuration information, the example satellite zone player 1302 changes the dual spectrum interface 704 to use the specified channel in the second spectrum. In one example, when the satellite zone player 1302 has changed the dual spectrum interface 704, the example satellite zone player 1302 may transmit a message to the primary zone player 1202 to confirm the change. Transmitting the message immediately after the change and prior to other zone players recognizing that the satellite zone player 1302 has dropped out of the mesh network advantageously reduces (e.g., minimizes) configuration delays. In another example, when the satellite zone player 1302 has changed the dual spectrum interface 704, the example satellite zone player 1302 may start transmitting probe messages. The probe messages, when received by the primary zone player 1202, may be considered an implicit acknowledgement that satellite zone player 1302 has made the change.

When ready, the example primary zone player 1202 begins transmitting probe packets (e.g., universal plug-and-play (uPnP)-formatted messages) containing control information via the specified channel in the second spectrum. The example probe packets include at least the identifying information (e.g., the UUID, the MAC address of the interface 606a, etc.) transmitted by the primary zone player 1202 to the satellite zone player 1302. The example satellite zone player 1302 receives the probe packets and compares the identifying information to the identifying information received from the primary zone player 1202 via the first channel (e.g., compares the UUIDs). If the identifying information is the same, the example satellite zone player 1302 may acknowledge receipt to the primary zone player 1202.

On the other hand, in the case of the multiple primary zone players 1202, 1204 operating different star networks (e.g., the star network 1402 and a star network 1404 including the primary zone player 1204), the example satellite zone player 1302 can possibly receive probe packets from the second primary zone player 1204. In that case, the example satellite zone player 1302 determines that the identifying information is not the same as the identifying information received via the control information from the primary zone player 1202. As a result, the example satellite zone player 1302 discards or ignores the probe packet and monitors for a probe packet from the primary zone player 1202.

When the primary zone player 1202 has transmitted the probe packet via the channel in the second spectrum (and receiving acknowledgement, if applicable), the example primary zone player 1202 may begin transmitting audio information to the satellite zone player 1302. In some examples, the primary zone player 1202 may wait until it has received indication (e.g., an acknowledgement message or a probe message) before transmitting audio information to the satellite zone player 1302. In some examples, the primary zone player 1202 also transmits probe packets (e.g., keep-alive packets, configuration packets, etc.). The satellite zone player 1302 receives and decodes the audio information. In the example of FIG. 14, the audio information also includes identifiers (e.g., a UUID, a MAC address of the second spectrum interface 606a, etc.) to identify the audio as belonging to the star network 1402 and/or as being transmitted from the primary zone player 1202.

Figure 15:
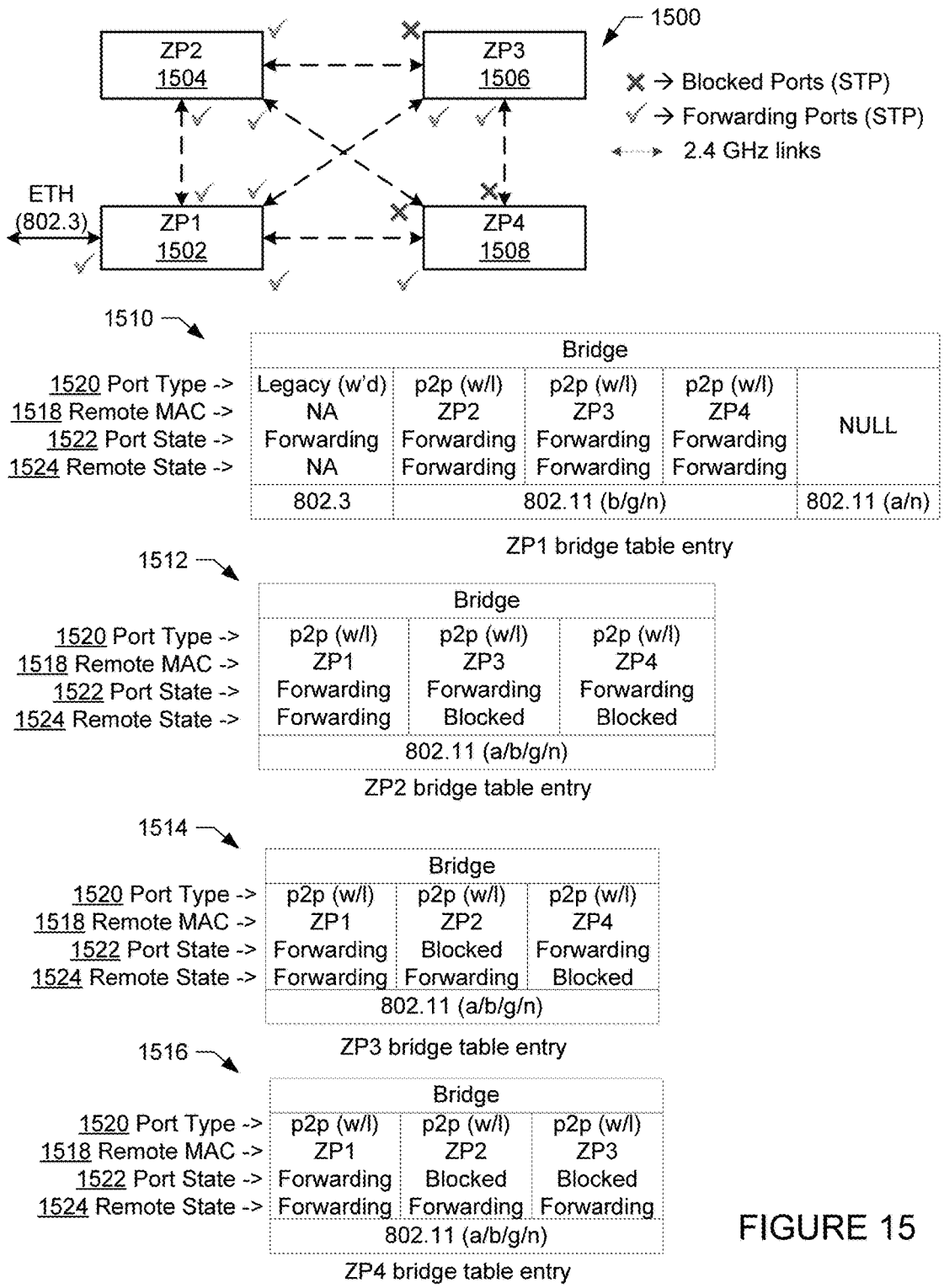
FIG. 15 shows a block diagram of another example zone player network and respective spanning tree protocol tables when the zone player network is in a mesh configuration.

FIG. 15 shows a block diagram of another example zone player network 1500 including a primary zone player 1502 and multiple satellite zone players 1504, 1506, 1508. FIG. 15 further shows respective spanning tree protocol tables 1510, 1512, 1514, 1516 for the zone players 1502-1508 when the zone player network is in a mesh configuration. In the mesh configuration illustrated in FIG. 15, any of the zone players 1502-1508 may be grouped into a zone group with any one or more of the other zone players 1502-1508 and/or with any other zone players connected to a common network.

The example spanning tree protocol tables 1510-1516 illustrate the spanning tree protocol configurations for the respective zone players 1502-1508. In the example zone player network 1500, the primary zone player 1502 (e.g., ZP1) is configured as the root node with respect to the satellite zone players 1504-1508. However, in some example zone player networks other zone players besides the primary zone player 1502 may be configured as the root node of the network, in which case the primary zone player 1502 is configured as a node through which the lowest-cost path from the satellite zone players 1504-1508 The satellite zone players 1504-1508 are configured as nodes based on their respective addresses.

The spanning tree protocol table 1510 for the primary zone player 1502 includes forwarding tables for ports used by the example primary zone player 1502. When a satellite zone player (e.g., the satellite zone player 1508) is initially connected to the network 1500, the spanning tree protocol controllers 614, 712 of the other zone players 1502-1506 add respective entries to reflect the new connection to the satellite zone player 1508.

The mesh network is generated at runtime when devices see probes from other devices (e.g., via a channel in a first wireless spectrum, such as the 2.4 GHz spectrum). When a new device is discovered (e.g., added to the network 1500), each existing device on the network (e.g., the zone players 1502-1506) create respective peer-to-peer tunnels in their bridge layers. The peer-to-peer tunnels identify the new device 1518 (e.g., the MAC address of the new device), identify the type of port or tunnel 1520 (e.g., peer-to-peer, wireless peer-to-peer), identify the forwarding state of the port or tunnel 1522 (e.g., what to do with packets received from the new device), and identify the forwarding state of the remote port tunnel 1524 (e.g., what the new device is to do with packets received from the device associated with the spanning tree protocol table).

In the example network 1500, probes are examined to see if they contain an element that includes the identifying information (e.g., the UUID) of the expected primary zone player 1502. If the probe is not from the primary zone player 1502, the probe is dropped and no peer-to-peer tunnel is created. As a result, a wired Ethernet port may be bridged to a single wireless peer-to-peer tunnel that connects one of the satellite zone players 1504-1508 to the primary zone player 1502. If the wireless peer-to-peer tunnel is not established because the satellite zone player 1504-1508 did not receive probe from the primary zone player 1502, the zone player network 1500 can still be established with wired ports.

By initiating the zone player network 1500 as a single-linked mesh network (or when a zone player configuration changes from a mesh mode to a star or satellite mode), extra topology changes of the network 1500 are potentially reduced (e.g., minimized). If the zone player network 1500 was initiated as a full mesh, and peer-to-peer links to zone players, other than the primary zone player 1502, are removed after the primary zone player 1502 is discovered, one or more links that are in used could be removed, thereby disrupting playback. Additionally, initiating new satellite zone players in a full mesh mode could force an extra topology change every time a satellite zone player boots (e.g., is initiated and/or added to the network 1500). In some instances, such topology changes can potentially result in a significant performance degradation to the network while the network 1500 is reconfigured.

As illustrated in the spanning tree protocol tables 1512-1516, some of the example ports are blocked according to the spanning tree protocol. The blocked ports reduce (e.g., prevent) looping of data in the network.

Figure 16:
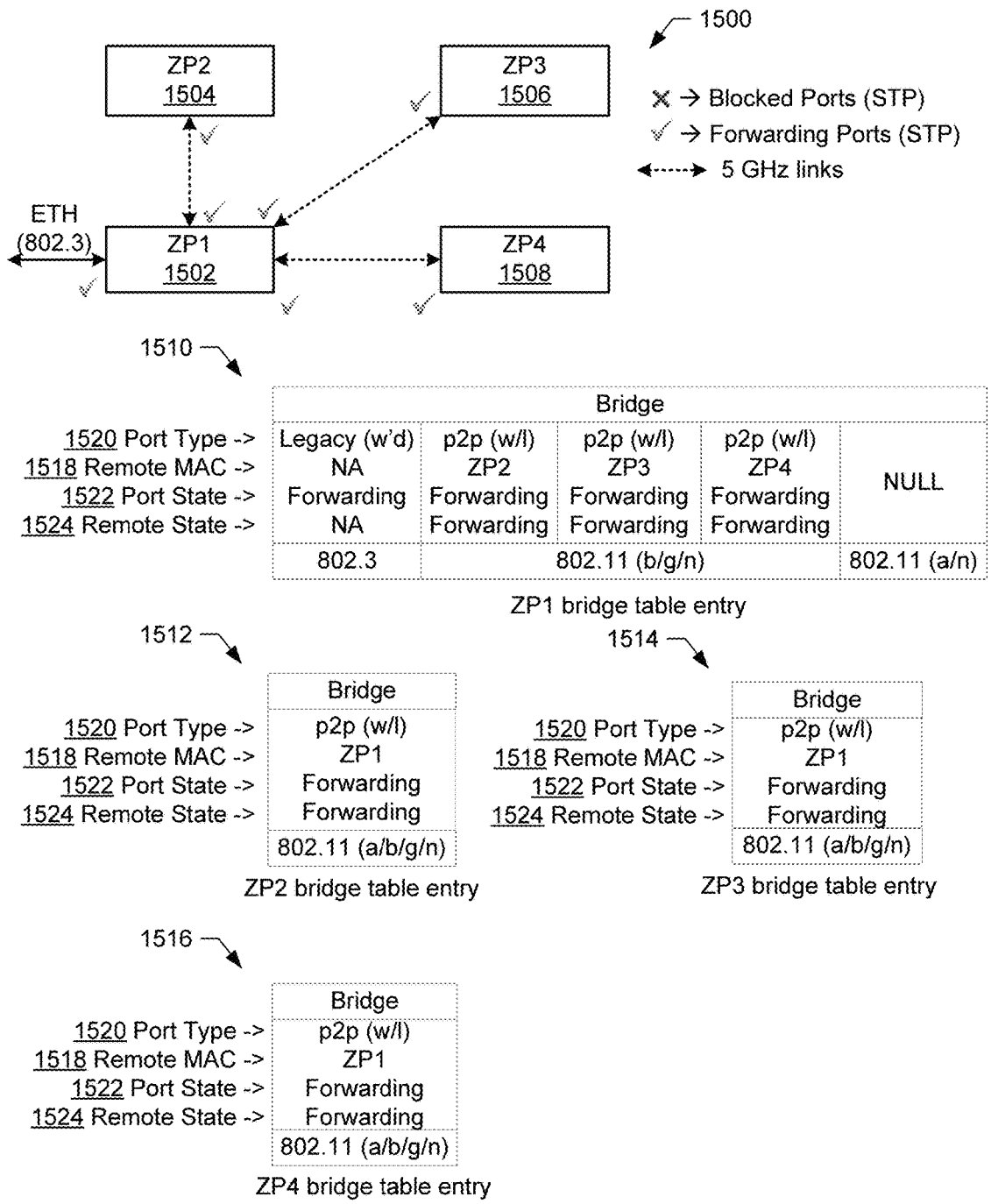
FIG. 16 shows the example zone player network of FIG. 15 and the respective spanning tree protocol tables when the zone player network has been configured as a star network to provide low-latency audio.

FIG. 16 shows the example zone player network 1500 of FIG. 15 and the respective spanning tree protocol tables 1510-1512 when the zone player network 1500 has been configured as a star network to provide low-latency audio. The example zone player network 1500 of FIG. 16 has been converted to the star network. To accomplish the conversion, the mesh configuration is converted to single peer-to-peer links connecting each of the example satellite zone players 1504-1508 to the primary zone player 1502. As a part of the conversion, the example primary zone player 1502 sends probe packets to each of the example satellite zone players 1504-1508 that are to be converted. The example primary zone player 1502 and the satellite zone players 1504-1508 update their respective spanning tree protocol tables to reflect the single link between each satellite zone player 1504-1508 and the primary zone player 1502.

While primary zone players 600 and satellite zone players 700 have been illustrated in FIGS. 6 and 7, one or more of the interfaces, data structures, elements, processes and/or devices illustrated in FIGS. 6 and 7 can be combined, divided, re-arranged, omitted, eliminated and/or implemented in any way. Further, the example processor 408, the example memory 410, the example audio processing component 412, the example module 414, the example audio amplifier 416, the example speakers 418, the example antenna(s) 420, first spectrum interface 604, the example second spectrum interface 606, the example control interface 608, the example audio interface 610, the example channel selector 612, the example dual spectrum interface 704, the example control interface 706, the example audio interface 708, the example channel selector 710, and/or more generally, primary zone player 600 and/or the example satellite zone player 700 can be implemented by hardware, software, firmware and/or any combination of hardware, software and/or firmware. Thus, for example, any of the example processor 408, the example memory 410, the example audio processing component 412, the example module 414, the example audio amplifier 416, the example speakers 418, the example antenna(s) 420, the example first spectrum interface 604, the example second spectrum interface 606, the example control interface 608, the example audio interface 610, the example channel selector 612, the example dual spectrum interface 704, the example control interface 706, the example audio interface 708, the example channel selector 710, and/or more generally, primary zone player 600 and/or the example satellite zone player 700 could be implemented by one or more circuit(s), programmable processor(s), application specific integrated circuit(s) (ASIC(s)), programmable logic device(s) (PLD(s)) and/or field programmable logic device(s) (FPLD(s)), and so on.

When any apparatus claim of this patent is read to cover a purely software and/or firmware implementation, at least one of the example processor 408, the example memory 410, the example audio processing component 412, the example module 414, the example audio amplifier 416, the example speakers 418, the example antenna(s) 420, the example first spectrum interface 604, the example second spectrum interface 606, the example control interface 608, the example audio interface 610, the example channel selector 612, the example dual spectrum interface 704, the example control interface 706, the example audio interface 708, and/or the example channel selector 710 are hereby expressly defined to include a computer readable storage medium such as a memory, DVD, CD, and so on, storing the software and/or firmware. Further still, the example audio playback device 602 and/or the example audio information source 604 can include one or more elements, processes and/or devices in addition to, or instead of, those illustrated in FIGS. 7 and 8, and/or can include more than one of any or all of the illustrated elements, processes and devices.

Figure 17:
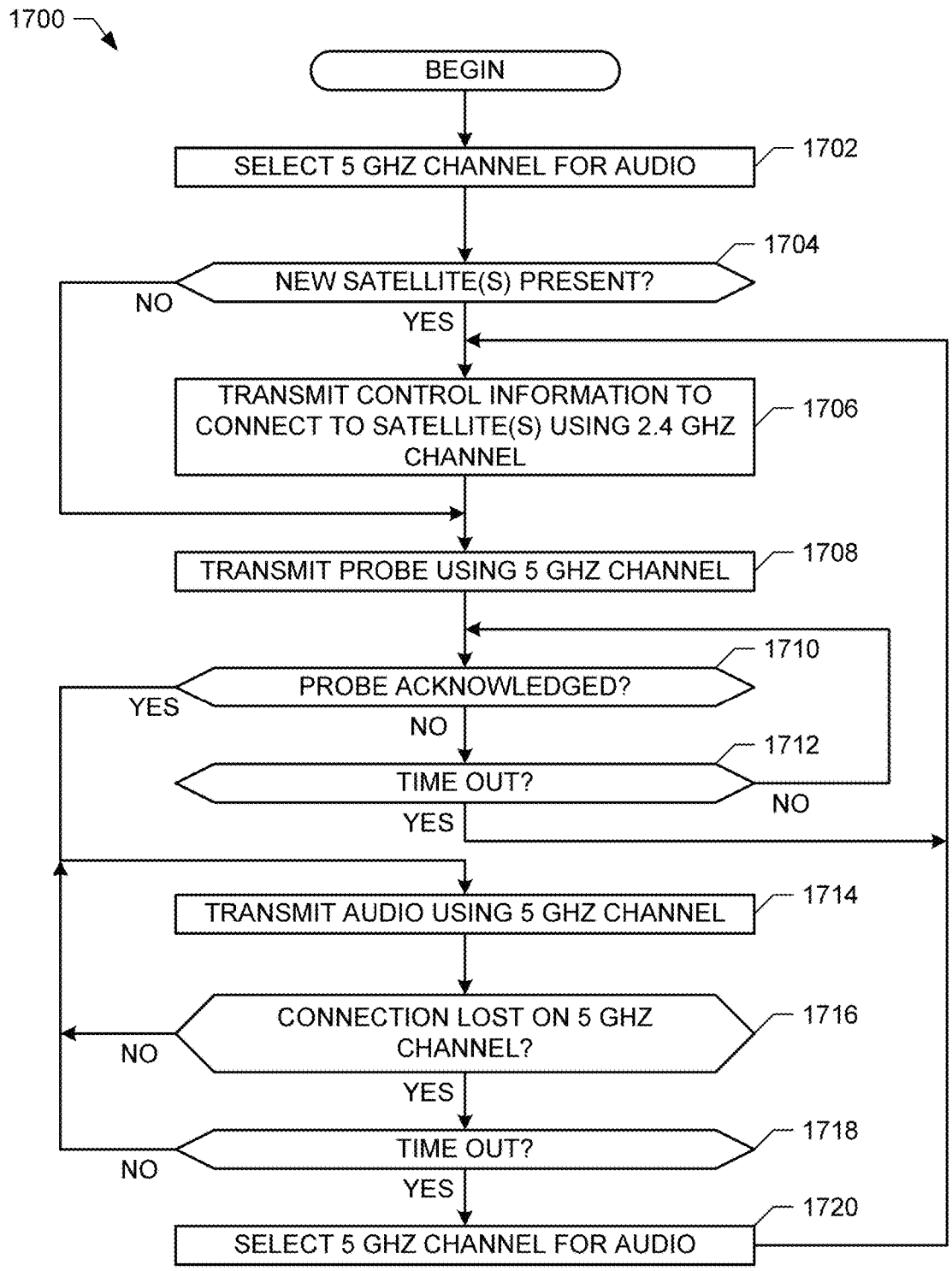
FIG. 17 shows a flowchart representative of an example method to provide low-latency audio via one or more satellite zone players.

FIG. 17 shows a flowchart representative of an example method 1700 to provide low-latency audio via one or more satellite zone players. The example method 1700 may be performed by any of the example primary zone players 600, 802, 1202, 1204, and/or 1502 of FIGS. 6, 8, 10, and/or 12-15.

The example method 1700 of FIG. 17 may begin when, for example, a user chooses to configure a home theater by grouping several zone players together. The method 1700 begins by selecting (e.g., via the channel selector 612 of FIG. 6) an audio channel in a second spectrum, such as the 5 GHz spectrum (block 1702). The example primary zone player 600 determines (e.g., via the control interface 608 and/or the second spectrum interface 606) whether any new satellite zone players are present (block 1704). In some examples, determining whether any new satellite zone players are present includes determining whether any satellite zone players are to be connected to a star network (e.g., a home theater network).

If there are new satellite zone player(s) present (block 1704), the example primary zone player 600 transmits control information to the satellites via a channel in a first frequency spectrum (e.g., the 2.4 GHz spectrum) (block 1706). For example, the primary zone player 600 may transmit information to identify the primary zone player 600 (e.g., a UUID, a UDN, a MAC address of the first spectrum interface 606, etc.) and information identifying the selected channel in the second frequency spectrum. The example primary zone player 600 transmits a probe via the selected channel in the second frequency spectrum (e.g., via the 5 GHz channel) (block 1708). For example, the primary zone player 600 may transmit a probe containing an identification of the primary zone player 600 (e.g., a UUID, a MAC address of the second spectrum interface 606, etc.) (block 1708).

The example primary zone player 600 determines whether the transmitted probe has been received (block 1710). For example, when a satellite zone player receives the probe, the satellite zone player may acknowledge the probe by transmitting an acknowledgement to the primary zone player 600 via the same channel or a different channel in the same spectrum (e.g., the 5 GHz spectrum). In another example, when a satellite zone player receives the probe, the satellite zone player may start transmitting probe messages itself over the channel on the same spectrum (e.g., the 5 GHz spectrum). If the probe has not been explicitly or implicitly acknowledged (block 1710), the example primary zone player 600 determines whether a time out condition has been reached (block 1712). For example, the primary zone player 600 may wait for a time to receive the probe acknowledgement (explicit or implicit) and, if the probe acknowledgement (explicit or implicit) is not received within that time, the primary zone player 600 identifies a time out condition. If there is not a timeout condition (block 1712), control returns to block 1710 to determine whether the probe has been explicitly or implicitly acknowledged. If a time out condition occurs (block 1712), control returns to block 1706 to retransmit control information to the satellite zone players If the probe is explicitly or implicitly acknowledged (block 1710), the example primary zone player 600 may transmit audio information (e.g., via the audio interface 610 and the second spectrum interface 606) via the selected channel (e.g., the 5 GHz channel) (block 1714). The audio information may be based on audio information received from, for example, a home theater source, another zone player, a local network source, and/or an Internet source.

The primary zone player 600 determines (e.g., periodically, in response to missing communications from a satellite zone player, etc.) whether one or more connections have been lost or the quality has been degraded below a threshold on the selected channel (e.g., 5 GHz spectrum channel) (block 1716). If no connections have been lost or the quality remains above a threshold on the selected channel (block 1716), the primary zone player 600 continues to transmit audio (block 1714).

If one or more connections have been lost or the quality has been degraded past a threshold (block 1716), the example primary zone player 600 determines whether a time out condition has occurred (block 1718). For example, if connection(s) have been lost (e.g., idle, nonresponsive, etc.) or the quality has been degraded below a threshold (e.g., the packet error rate has increased beyond, for example, one percent) for a threshold amount of time, a time out condition may be considered to have occurred and the primary zone player 600 may expect the connection(s) to not be recovered. If a time out condition has occurred (block 1718), the example primary zone player 600 (e.g., via the channel selector 612) selects a new channel in the second spectrum (e.g., the 5 GHz spectrum) to be used to transmit audio (block 1720). Control then returns to block 1706 to transmit the control information via a channel in either the first or second spectrum. For example, the satellite zone player(s) to which the connection was lost may be configured to detect the lost connection and, after a time out condition, to revert to a channel in the first spectrum for reconfiguration.

Detecting a lost connection or degraded quality below a threshold in block 1716 may additionally or alternatively include determining whether an unacceptable amount of latency in delivering audio to one or more satellite speakers.

Figure 18:
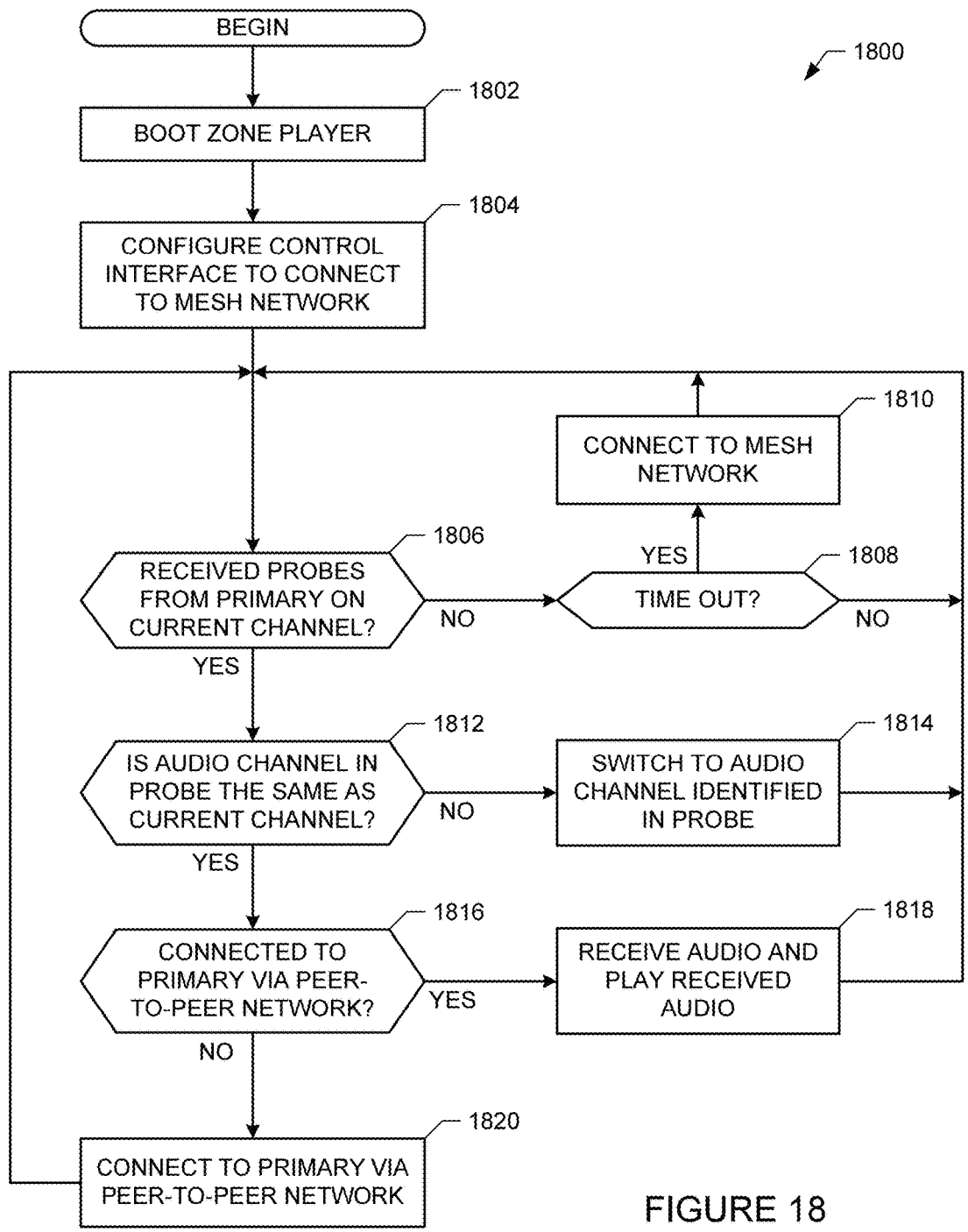
FIG. 18 shows a flowchart representative of an example method to connect a satellite zone player to a zone player network.

FIG. 18 shows a flowchart representative of an example method 1800 to connect a satellite zone player to a zone player network. The example method 1800 may be performed by any of the example satellite zone players 700, 804, 806, 1302, 1504, 1506, and/or 1508 of FIGS. 7-16. The example method 1800 may be used in combination with the example method 1700 of FIG. 17 to provide low-latency audio (e.g., for a home theater system).

The example method 1800 begins by booting the zone player (e.g., the example satellite zone player 700 of FIG. 7) (block 1802). Booting the satellite zone player 700 may occur on power up of the satellite zone player 700 and may include, for example, initializing the dual spectrum interface 704 of FIG. 7 to connect to a channel in a first spectrum (e.g., a predetermined channel and/or spectrum, the 2.4 GHz spectrum) and/or initializing the control and audio interfaces 706, 708. The example satellite zone player 700 configures the control interface 706 to connect to a mesh network (e.g., a zone player network, the mesh network 814 of FIGS. 8-11) (block 1804). Connecting to the mesh network 814 may include transmitting and/or receiving configuration information from one or more other zone players (e.g., the zone players 810, 812 of FIGS. 8-11) and/or controllers (e.g., the controller 500 of FIG. 5).

The example satellite zone player 700 determines whether any probes have been received from a primary zone player (e.g., the primary zone players 600, 802 of FIGS. 6 and 8) on the current channel (e.g., a channel currently tuned by the dual spectrum interface 704) (block 1806). The probes may have different contents based on the current channel and/or spectrum. For example, probes received when the current channel is in the first spectrum may include channel information for an audio channel in a second spectrum (e.g., the 5 GHz spectrum) and identifying information for the primary zone player 600 from which the satellite zone player 700 is to receive audio information in a star configuration. In contrast, probes received from the primary zone player 600 when the current channel is in the second spectrum (e.g., the 5 GHz spectrum) may include the identifying information for the primary zone player 600 and/or control information such as keep-alive information.

If no probes have been received (block 1806), the example satellite zone player 700 determines whether a time out condition has occurred (block 1808). For example, if a probe has not been received from the primary zone player 600 for at least a threshold amount of time, the example satellite zone player 700 may identify a time out condition. The example time out condition of block 1808 may be a same or different amount of time from the time out condition of block 1712 of FIG. 17. If a time out condition has occurred (block 1808), the example satellite zone player 700 (e.g., via the control interface 706) connects to the mesh network (e.g., a zone player network) (block 1810). For example, the control interface 706 may configure the dual spectrum interface 704 to connect to a channel in the first spectrum and/or to a channel in the first spectrum different from a channel that was previously used. After connecting to the mesh network (block 1810), the dual spectrum interface 704 for the example method 1800 is configured to communicate in the first spectrum. After connecting to the mesh network (block 1810), or if a time out condition has not occurred (block 1808), control returns to block 1806 to determine whether any probes have been received.

If probes have been received from the primary zone player 600 on a current channel (block 1806), the example satellite zone player 700 determines whether the audio channel is the same as the current channel (block 1812). For example, the control interface 706 may determine whether the dual spectrum interface 704 is configured to communicate via a selected audio channel (e.g., identified to the satellite zone player via a probe). If the audio channel in the probe is not the same as the current channel (block 1812), the example channel selector 710 switches the dual spectrum interface 704 to the audio channel identified in the probe (block 1814). After switching to the audio channel (block 1814), the dual spectrum interface 704 for the example method 1800 is configured to communicate in the first spectrum. Control then returns to block 1806 to determine whether probes have been received on the new current channel.

If the audio channel in the probe is the same as the current channel (block 1812), the example satellite zone player 700 determine whether it is connected to the primary zone player 600 via a star network (block 1816). For example, the control interface 706 may evaluate a spanning tree protocol table to determine the devices and/or ports to which the satellite zone player 700 is connected. If the spanning tree protocol table includes a single peer-to-peer connection, the control interface determines that the satellite zone player 700 is connected via a star network. In some other examples, the control interface 706 maintains a state or flag that is modified when the satellite zone player 700 connects to a primary zone player via a star network and/or connects to a different device and/or via a different type of connection.

If the satellite zone player 700 is connected to the primary zone player via a star network (block 1816), the example satellite zone player 700 receives audio information (e.g., via the audio interface 708 and/or the dual spectrum interface 704) and plays the received audio (e.g., via the components 408-418 of FIG. 7). In some examples, the audio information includes synchronization information to enable the satellite zone player 700 to play the audio in synchrony with audio played by the primary zone player 600 and/or audio played by other satellite zone players connected to the primary zone player 600. Control then returns to block 1806 to determine whether any probes have been received (block 1806). In some examples, the satellite zone player 700 continues to receive audio information via a first channel and play audio while receiving probes (e.g., control information) via the audio channel (e.g., interspersed with the audio information) and/or via a control channel.

If the example satellite zone player 700 is not connected to the primary zone player 600 via a star network (block 1816), the example satellite zone player 700 connects to the primary zone player 1820 via a star network (block 1820). For example, the control interface 706 may reconfigure a spanning tree protocol table from a first configuration (e.g., for a mesh network) to a second configuration (e.g., for the star network). Control then returns to block 1806 to determine whether probes have been received from the primary zone player 600.

Using the example methods 1700 and/or 1800 of FIGS. 17 and 18, a primary zone player may configure one or more satellite zone players to use one or more low-latency channel(s) and to provide low-latency audio for playback by the satellite zone players. The example method 1700 enables the delivery of high-quality audio within the window of time that reduces (e.g., avoids) human perception of lag between the audio and corresponding video. The example method 1700 further enables the primary zone player to reconfigure the satellite zone players in the event of a loss of connection. For example, if interference is introduced into the selected channel used for audio information delivery such that one or more connections are lost or latency is increased to an unacceptable amount, the primary zone player may select a new channel in the same spectrum for use in delivering the audio information and reconfigure the satellite zone players accordingly.

VI. Conclusion

As discussed above, systems and methods are provided to offer wireless playback of audio in a home theater environment while reducing or avoiding perceptible lag between presented video and audio. The embodiments described herein may be further useful by systems in which low-latency delivery of audio content over a wireless communication link is required or preferred.

In one example, an audio device is provided that is comprised of a control interface, a channel selector, and an audio interface, whereby the audio device itself may include audio playback capability. The control interface transmits control information to a playback device via a frequency channel in a first spectrum. In one embodiment, the control information identifies the audio interface and/or frequency channel to be used to transmit the audio information to the playback device. The channel selector selects a frequency channel from a second spectrum for transmitting audio information to a playback device. The audio interface transmits the audio information to the playback device via the frequency channel of the second spectrum.

In some embodiments, when the control interface detects a loss of communication with the playback device, the channel selector selects a different frequency channel from the second spectrum for transmitting audio information to a playback device. In other embodiments, when the control information detects a loss of communication over the channel in the second spectrum, the channel selector selects a different frequency channel from the first spectrum for transmitting audio information to a playback device.

In some embodiments, the control interface of the audio device is used to transmit control information to a plurality of audio devices other than the playback device, while the audio interface of the audio device transmits the audio information to the playback device. In further embodiments, the audio devices other than the playback device is configured with the audio device on a mesh network, and the playback device is configured in a star network with the audio device.

In another example, an audio device is provided that is composed of a control interface, a channel selector, an audio interface, and a speaker. The control interface receives control information via a first channel in a first spectrum. The control information includes identification of the audio interface, audio information provider, and/or frequency channel in a second spectrum. The channel selector selects the audio channel based on the control information. The audio interface receives the audio information from the audio device. The speaker outputs the audio based on the audio information.

In some embodiments the control interface connects to a mesh network of audio devices when a frequency channel for the audio interface is not selected or is de-selected. In further embodiments, the control interface connects to a star network with an audio device when the audio interface is selected.

In another example, a method is provided that comprises transmitting control information to a playback device via a communications channel in a first spectrum, selecting in a communications channel in a second spectrum, and transmitting audio information to the playback device via the second communications channel in the second spectrum.

A further method comprises detecting a loss of communication on the a communications channel, and selecting a different communications channel in the second spectrum for transmission of audio information.

In some embodiments, a method further comprises communicating with devices other than the playback device via the communications channel of the first spectrum.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A first playback device comprising:
   a network interface;
   at least one processor;
   a non-transitory computer-readable medium; and
   program instructions stored on the non-transitory computer-readable medium that, when executed by the at least one processor, cause the first playback device to perform functions comprising:
      selecting a first channel of a first frequency spectrum for use in transmitting audio information to one or more other playback devices;
      detecting the presence of a second playback device configured to receive audio information from the first playback device;
      in response to detecting the presence of the second playback device, transmitting, via the network interface, first control information to the second playback device via a second channel of a second frequency spectrum that differs from the first frequency spectrum;
      transmitting, via the network interface, a probe to the second playback device via the first channel of the first frequency spectrum;
      determining that the probe has been received by the second playback device;
      in response to determining that the probe has been received by the second playback device, transmitting, via the network interface, at least a first portion of given audio information to the second playback device via the first channel of the first frequency spectrum, wherein the first portion of the given audio information is to be played by the second playback device;
      while transmitting at least the first portion of the given audio information to the second playback device via the first channel of the first frequency spectrum, determining that a quality of transmission of the first portion of the given audio information from the first playback device to the second playback device via the first channel of the first frequency spectrum has degraded below a threshold;

selecting a third channel of the first frequency spectrum that differs from the first channel;

transmitting, via the network interface, second control information to the second playback device via the second channel of the second frequency spectrum, wherein the second control information comprises information that identifies the third channel of the first frequency spectrum; and switching from transmitting, via the network interface, at least the first portion of the given audio information to the second playback device via the first channel of the first frequency spectrum to transmitting, via the network interface, at least the first portion of the given audio information to the second playback device via the third channel of the first frequency spectrum.

2. The first playback device of claim 1, further comprising program instructions stored on the non-transitory computer-readable medium that, when executed by the at least one processor, cause the first playback device to perform functions comprising:

playback a second portion of the given audio information.

3. The first playback device of claim 2, further comprising program instructions stored on the non-transitory computer-readable medium that, when executed by the at least one processor, cause the first playback device to perform functions comprising:

transmitting, via the network interface, a third portion of the given audio information to a third playback device via the first channel of the first frequency spectrum, wherein the first portion of the given audio information is to be played by the second playback device and the third portion of the given audio information is to be played by the third playback device, and wherein the second playback device and the third playback device are in a star network with the first playback device.

4. The first playback device of claim 2, wherein playback of the second portion of the given audio information comprises playback of the second portion of the given audio information in synchrony with the second playback device playing back the first portion of the given audio information.

5. The first playback device of claim 1, wherein the first control information comprises information that identifies at least one of (i) the first playback device and (ii) the first channel of the first frequency spectrum.

6. The first playback device of claim 1, wherein the probe comprises an identification of the first playback device.

7. The first playback device of claim 1, wherein the given audio information comprises audio information received from at least one of a home theater source, a third playback device, a local network source, or an Internet source.

8. The first playback device of claim 1, wherein detecting the presence of a second playback device configured to receive audio information from the first playback device comprises:

receiving, via the network interface, an indication that the second playback device is configured to receive audio information from the first playback device.

9. The first playback device of claim 1, wherein the first frequency spectrum is a 5 GHz spectrum and the second frequency spectrum is a 2.4 GHz spectrum.

10. The first playback device of claim 1, wherein the network interface comprises:

a first spectrum interface that is configured to facilitate communication in the first frequency spectrum; and a second spectrum interface that is configured to facilitate communication in the second frequency spectrum.

11. The first playback device of claim 1, wherein the first playback device is a sound bar and the second playback device is a subwoofer.

12. The first playback device of claim 1, wherein determining that the quality of transmission of the first portion of the given audio information from the first playback device to the second playback device via the first channel of the first frequency spectrum has degraded below the threshold comprises:

determining that a latency associated with the transmission of the first portion of the given audio information from the first playback device to the second playback device via the first channel of the first frequency spectrum is greater than a threshold latency.

13. A method comprising:

selecting, by a first playback device, a first channel of a first frequency spectrum for transmitting audio information to one or more other playback devices;

detecting, by the first playback device, the presence of a second playback device configured to receive audio information from the first playback device;

in response to detecting the presence of the second playback device, transmitting, by the first playback device via the network interface, first control information to the second playback device via a second channel of a second frequency spectrum that differs from the first frequency spectrum;

transmitting, by the first playback device via the network interface, a probe to the second playback device via the first channel of the first frequency spectrum;

determining, by the first playback device, that the probe has been received by the second playback device;

in response to determining that the probe has been received by the second playback device, transmitting, by the first playback device via the network interface, at least a first portion of given audio information to the second playback device via the first channel of the first frequency spectrum, wherein the first portion of the given audio information is to be played by the second playback device;

while transmitting, by the first playback device via the network interface, at least the first portion of the given audio information to the second playback device via the first channel of the first frequency spectrum, determining, by the first playback device, that a quality of transmission of the first portion of the given audio information from the first playback device to the second playback device via the first channel of the first frequency spectrum has degraded below a threshold;

selecting, by the first playback device, a third channel of the first frequency spectrum that differs from the first channel;

transmitting, by the first playback device via the network interface, second control information to the second playback device via the second channel of the second frequency spectrum, wherein the second control information comprises information that identifies the third channel of the first frequency spectrum; and switching from transmitting, by the first playback device via the network interface, at least the first portion of the given audio information to the second playback device via the first channel of the first frequency spectrum to transmitting, by the first playback device via the network interface, at least the first portion of the given audio information to the second playback device via the third channel of the first frequency spectrum.

14. The method of claim 13, further comprising:
playing back, by the first playback device, a second portion of the given audio information.

15. The method of claim 14, further comprising:
transmitting, by the first playback device via the network interface, a third portion of the given audio information to a third playback device via the first channel of the first frequency spectrum,
wherein the first portion of the given audio information is to be played by the second playback device and the third portion of the given audio information is to be played by the third playback device, and
wherein the second playback device and the third playback device are in a star network with the first playback device.

16. A non-transitory computer-readable medium having program instructions stored on the non-transitory computer-readable medium that, when executed by at least one processor, cause a first playback device to perform functions comprising:
selecting a first channel of a first frequency spectrum for use in transmitting audio information to one or more other playback devices;
detecting the presence of a second playback device configured to receive audio information from the first playback device;
in response to detecting the presence of the second playback device, transmitting, via a network interface, first control information to the second playback device via a second channel of a second frequency spectrum that differs from the first frequency spectrum;
transmitting, via the network interface, a probe to the second playback device via the first channel of the first frequency spectrum;
determining that the probe has been received by the second playback device;
in response to determining that the probe has been received by the second playback device, transmitting, via the network interface, at least a first portion of given audio information to the second playback device via the first channel of the first frequency spectrum, wherein the first portion of the given audio information is to be played by the second playback device;
while transmitting at least the first portion of the given audio information to the second playback device via the first channel of the first frequency spectrum, determining that a quality of transmission of the first portion of the given audio information from the first playback device to the second playback device via the first channel of the first frequency spectrum has degraded below a threshold;
selecting a third channel of the first frequency spectrum that differs from the first channel;
transmitting, via the network interface, second control information to the second playback device via the second channel of the second frequency spectrum, wherein the second control information comprises information that identifies the third channel of the first frequency spectrum; and
switching from transmitting, via the network interface, at least the first portion of the given audio information to the second playback device via the first channel of the first frequency spectrum to transmitting, via the network interface, at least the first portion of the given audio information to the second playback device via the third channel of the first frequency spectrum.

17. The non-transitory computer-readable medium of claim 16, further comprising program instructions stored on the non-transitory computer-readable medium that, when executed by the at least one processor, cause the first playback device to perform functions comprising:
playback a second portion of the given audio information; and
transmitting, via the network interface, a third portion of the given audio information to a third playback device via the first channel of the first frequency spectrum,
wherein the first portion of the given audio information is to be played by the second playback device, the second portion of the given audio information is to be played by the first playback device, and the third portion of the given audio information is configured to be played by the third playback device, and
wherein the second playback device and the third playback device are in a star network with the first playback device.

* * * * *